US011805770B2

(12) United States Patent
Jackson et al.

(10) Patent No.: US 11,805,770 B2
(45) Date of Patent: Nov. 7, 2023

(54) FAST PLANT ERADICATION USING AIMED UNNATURAL LOW ENERGY DUAL COMPONENT INDIGO REGION AND MEDIUM WAVELENGTH INFRARED SIGNALING ILLUMINATION

(71) Applicants: Jonathan A Jackson, Dayton, OH (US); Christopher Hoffman, Dayton, OH (US); Norman Novotney, Mason, OH (US); Joseph Carroll, Beavercreek, OH (US); Patrick A Jackson, Dayton, OH (US); Mark J Elting, Ossining, NY (US)

(72) Inventors: Jonathan A Jackson, Dayton, OH (US); Christopher Hoffman, Dayton, OH (US); Norman Novotney, Mason, OH (US); Joseph Carroll, Beavercreek, OH (US); Patrick A Jackson, Dayton, OH (US); Mark J Elting, Ossining, NY (US)

(73) Assignee: Global Neighbor, Inc, Dayton, OH (US)

(*) Notice: Subject to any disclaimer, the term of this patent is extended or adjusted under 35 U.S.C. 154(b) by 66 days.

(21) Appl. No.: 17/731,189

(22) Filed: Apr. 27, 2022

(65) Prior Publication Data
US 2022/0248658 A1    Aug. 11, 2022

Related U.S. Application Data

(62) Division of application No. 16/166,129, filed on Oct. 21, 2018, now Pat. No. 11,344,022.

(51) Int. Cl.
*A01M 21/00*   (2006.01)
*H05B 3/00*    (2006.01)
(Continued)

(52) U.S. Cl.
CPC ............ *A01M 21/00* (2013.01); *A01M 21/04* (2013.01); *G21K 5/00* (2013.01); *H05B 3/0033* (2013.01); *H05B 35/00* (2013.01)

(58) Field of Classification Search
CPC ........ A01M 21/00; A01M 21/04; G21K 5/00; H05B 3/0033; H05B 35/00;
(Continued)

(56) References Cited

U.S. PATENT DOCUMENTS 5,929,455 A  *  7/1999  Jensen .............. E01H 11/00
                                              250/455.11
8,872,136 B1 * 10/2014  Jackson ............ A01M 21/00
                                              250/492.1
(Continued)

*Primary Examiner* — Bao Q Truong
(74) *Attorney, Agent, or Firm* — ELTING PATENTS AND TECHNOLOGY LLC; Mark J. Elting

(57) ABSTRACT

Plant eradication and stressing of plants using illumination signaling where a short-time dual component, low energy, unnatural set of irradiances is applied, with no mutagenic or high radiative energy transfers in any wavelength for eradication by substantial high temperature thermally-induced leaf and plant component failure or incineration. An Indigo Region Illumination Distribution of wavelength 300 nm to 550 nm is directed to plant foliage and/or a plant root crown, while infrared radiation that is substantially Medium Wavelength Infrared radiation of 2-20 microns wavelength, 2.4-8.0 microns preferred, is directed to a plant root crown and/or soil immediately adjacent the root crown. The Indigo Region Illumination Distribution can pass through the MWIR emitter to form a compact illuminator that uses specific unnatural irradiances that provide unexpected plant control. The MWIR emitter can comprise borosilicate glass at 400° F. to 1000° F.

10 Claims, 17 Drawing Sheets

(51) Int. Cl.
*H05B 35/00* (2006.01)
*A01M 21/04* (2006.01)
*G21K 5/00* (2006.01)

(58) Field of Classification Search
CPC .. F21Y 2113/00; F21Y 2113/30; F21V 99/00; F02M 27/06; F21S 41/13
See application file for complete search history.

(56) References Cited

U.S. PATENT DOCUMENTS

| | | | | |
|---|---|---|---|---|
| 2003/0076028 | A1* | 4/2003 | Nieda | A01G 7/045 |
| | | | | 313/485 |
| 2018/0240228 | A1* | 8/2018 | Jackson | G06V 20/10 |

\* cited by examiner

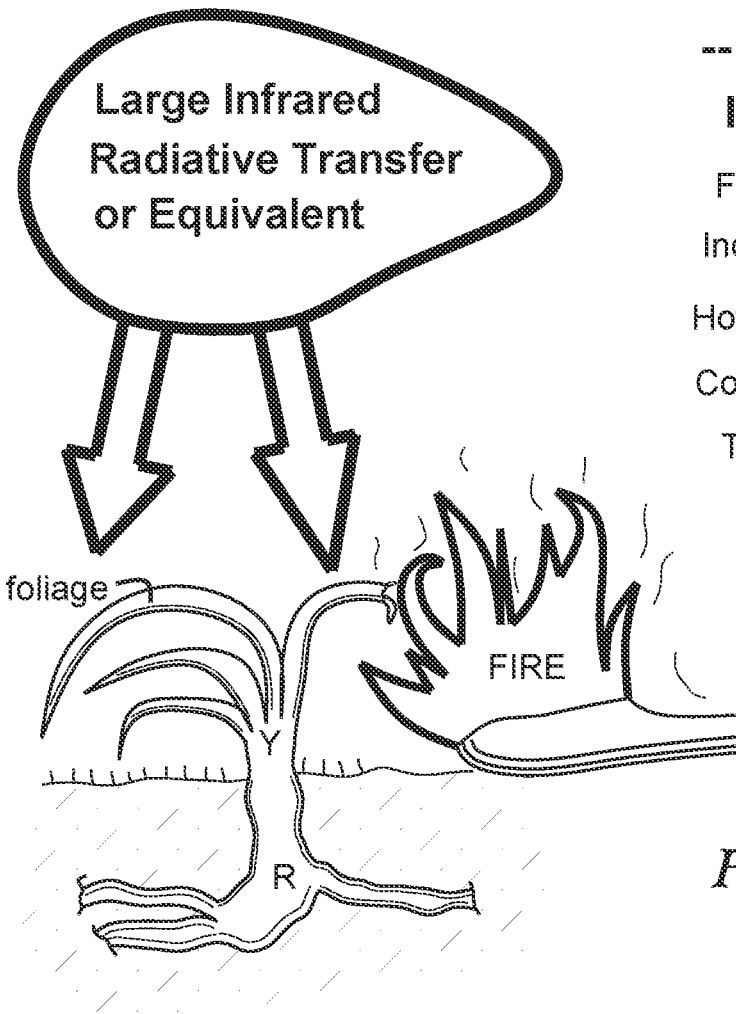
*Fig. 3*
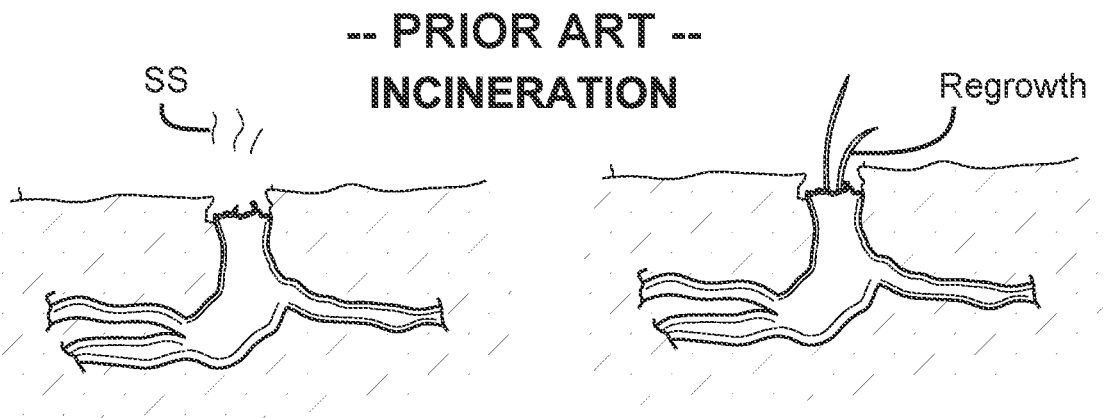
*Fig. 4*  *Fig. 5*

— PRIOR ART —

PROXIMITY PASS-THROUGH
CONFIGURATION
ILLUMINATOR

PROXIMITY PASS-THROUGH CONFIGURATION

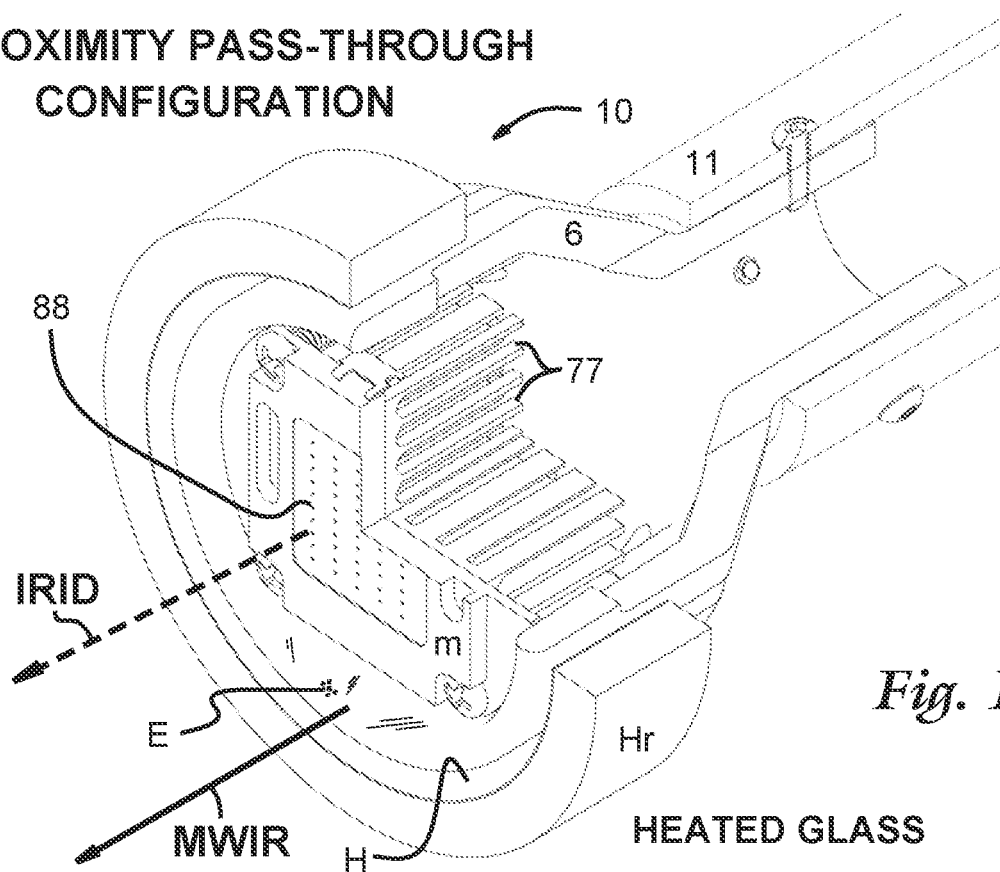
Fig. 18
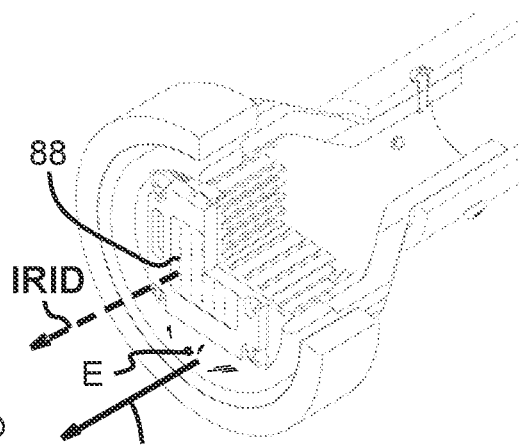
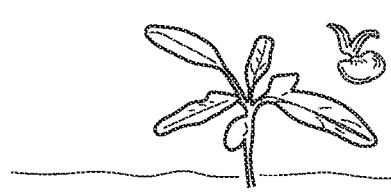
Fig. 19

Large / Dangerous Radiative Transfer

Scalding    Burning    UV "Burn"

Energy Distribution High in UV-B and UV-C    -- PRIOR ART --

Leaf / Plant Component Failure    Dehydration    Fig. 21

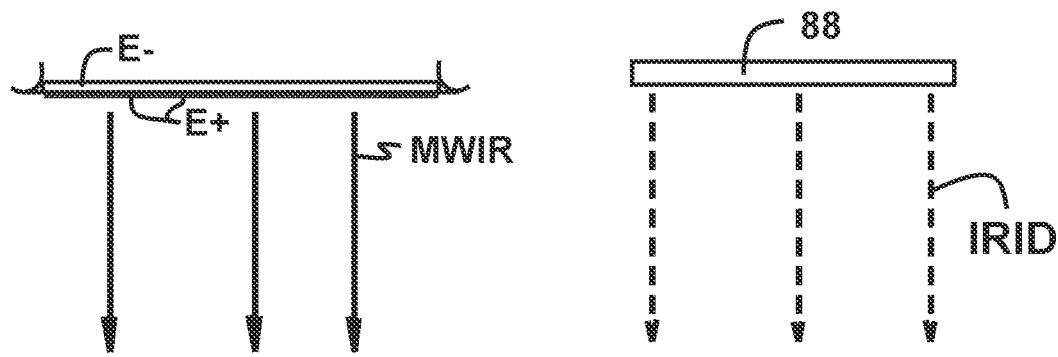
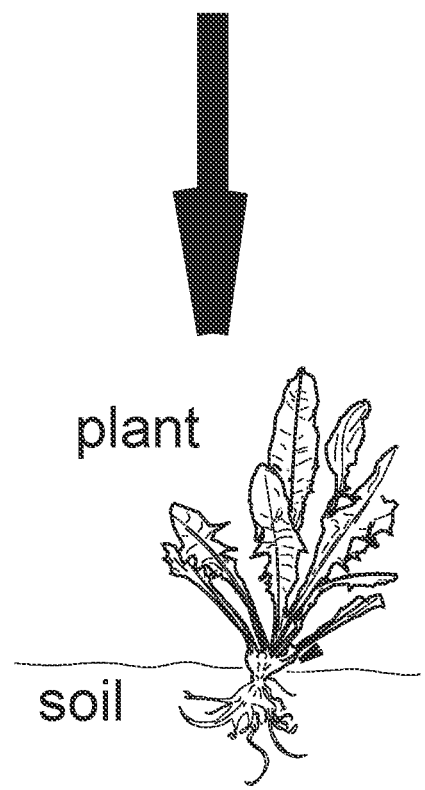
Fig. 27

MACHINE RECOGNITION
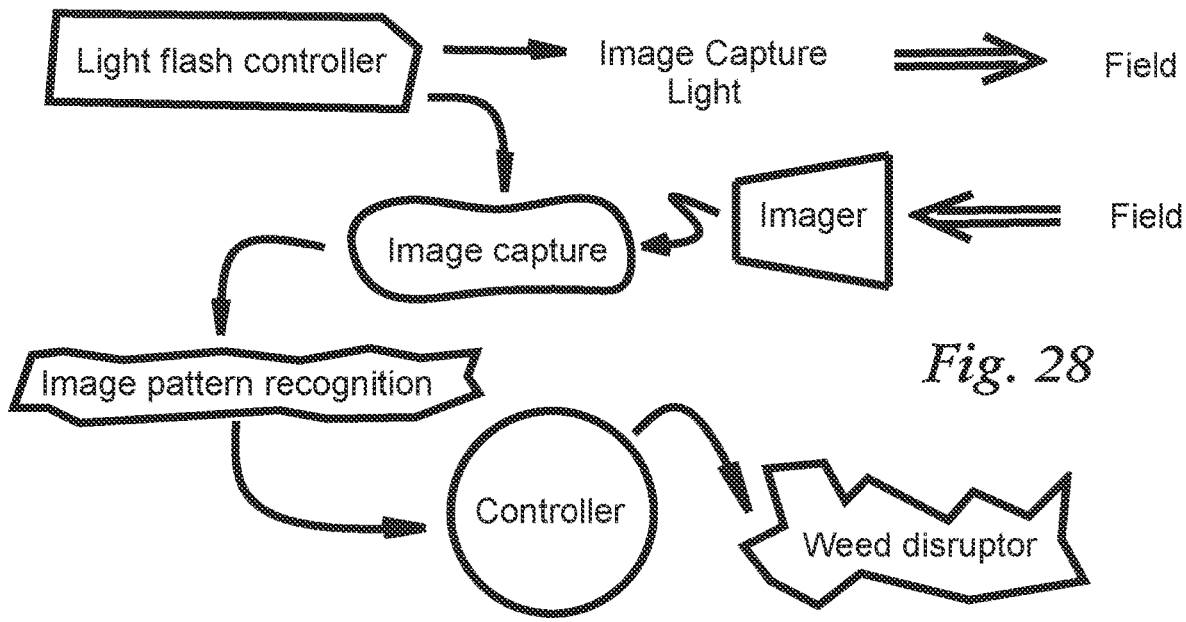
*Fig. 28*
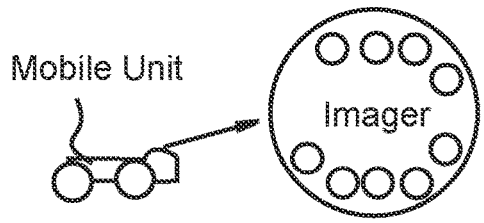
*Fig. 29*
*Fig. 30*
ADAPTIVE STRESS VECTORS
Forest Fire (above ground)
High intensity unprecedented MWIR signaling at root crown and immediately adjacent soil grade
High Intensity unprecedented IRID signaling at root crown / foliage
General high velocity shift in illumination exposure levels

FAST PLANT ERADICATION USING AIMED UNNATURAL LOW ENERGY DUAL COMPONENT INDIGO REGION AND MEDIUM WAVELENGTH INFRARED SIGNALING ILLUMINATION

CROSS-REFERENCE TO RELATED APPLICATIONS

This application is a divisional of U.S. patent application Ser. No. 16/166,129, filed Oct. 21, 2018, the disclosure of which is expressly incorporated herein by reference in its entirety.

TECHNICAL FIELD

This invention relates to plant and weed control or eradication using two-component illumination exposure. More specifically, it relates to a relatively low energy unnatural illumination protocol of duration less than one minute to induce plant death, or induce stress, by altering cellular metabolism, causing plant component damage, hormonal changes, damage to photosynthetic apparatus, possible interruption of healthy symbiosis of a plant root with rhizosphere microorganisms surrounding the root, and photooxidative stress. The invention does not use mutagenic or high radiative energy transfers in any energy or wavelength for eradication or destruction by thermally-induced leaf and plant component failure, incineration, or the like.

BACKGROUND OF THE INVENTION

In performing lawn care, groundskeeping and landscape care, in nearly all climates, at airports, military bases, corporate parks, industrial zones and facilities, and all manner of public and private facilities nationwide and worldwide, there is a great need for plant or weed control without the application of herbicides or toxic substances. There is also a need in agriculture for stressing plants for strength and selection.

Reducing the use of pesticides for weed and plant control has become an issue of national importance. Ground water is vitally important and the use of herbicides to prevent weeds from growing in homeowner and commercial lawns adversely impacts the quality of ground water. Most herbicides are persistent, soluble in water, and ingestion at high toxicity levels can be carcinogenic, affecting the human nervous system and causing endocrine disruption.

To protect water quality, simple removal methods not relying on pesticides are widely sought. Ninety-five percent of fresh water on earth is ground water. Ground water is found in natural rock formations called aquifers, and are a vital natural resource with many uses. Over 50% of the USA population relies on ground water as a source of drinking water, especially in rural areas.

In the USA, concerns about the potential impacts of herbicides on human health, as well as on terrestrial and aquatic ecosystems, have led to a wide range of monitoring and management programs by state and federal agencies, such as the U.S. Environmental Protection Agency (USEPA). For example, atrazine is a toxic, white, crystalline solid organic compound widely used as an herbicide for control of broadleaf and grassy weeds, and has been detected in concentrations problematic for human and animal health.

Mechanical and thermal phenomena marshaled against undesirable plants by prior art devices, methods and teachings are not effective overall, and this is due in large part to the natural robustness of plants, due to their physiology and responses to natural trauma. The role of repair, regrowth, and the beneficial effects of soil-borne microbes all play a role in the hardiness of plants to prior art thermal and mechanical methods for plant control.

Evaluation of effective methods for plant control using largely non-invasive phenomena is a difficult subject area to evaluate for general effectiveness because of many and varied biologic and environmental factors, including plant species, condition, type, environmental history, solar insolation, weather, and varied actions of insects, animals and microbiotica.

Relevant to this is that a key component for nearly all plants, including nuisance vegetation, is its root system. A typical root comprises various internal layers, including a xylem layer which operates essentially to transport water and provide, when needed, healing substances that repair wounds, such as burn wounds or severing, lacerations, and the like. Surrounding the xylem layer is a phloem layer, typically a living transport layer, which transports organic substances such as glucose and other sugars, amino acids and hormones. Surrounding phloem layer is a cortex, which is in turn surrounded by an epidermis, which acts like a skin which sheds dead cells.

In the immediate vicinity of the root of a plant, or on the root itself, is what is known as rhizospheric soil, which acts as a key root-soil interface of supreme importance for plant health. It is well known that soil-borne microbes interact with plant roots and soil constituents at this root-soil interface. This produces a dynamic environment of root-microbe interactions known as the rhizosphere, whose character and effect on the life of a plant varies widely with differing physical, chemical, and biological properties of the root-associated soil. Root-free soil without such organisms is known as bulk soil. Releasing of root exudates, such as epidermis flakes and other secretions, is sometimes called rhizodeposition and provides growth material, structural material or signals for root-associated microbiota. These microbiota feed on proteins and sugars released by roots. Protozoa and nematodes that feed on bacteria are also present in the rhizosphere, and provide nutrient cycling and disease suppression by warding off pathogens. [Ref: Oxford Journals Journal of Experimental Botany Volume 56, Number 417 Pp. 1761-1778, hereby incorporated in this disclosure in its entirety].

The balance of populations in a healthy symbiotic rhizosphere is important, because, in part, the bacteria which provide disease suppression interact with pathogens in a variety of ways, including mechanisms of antagonism, such as by competition for nutrients, parasitism, predation and antibiosis. Fungi, too, can be involved, and their actions, when turned from symbiotic to antagonistic, can be lethal for a plant.

There are three separate, but interacting, components recognized in the rhizosphere: the rhizospheric soil, the rhizoplane, and the root itself. The rhizosphere is soil influenced by roots via release of substances that affect microbial activity. The rhizoplane is the root surface, including the strongly adhering soil particles. The root itself also participates, because certain micro-organisms, known as endophytes, are able to colonize root tissues.

Any method to eradicate nuisance vegetation is typically influenced by the overall effect—and possible later influence—on the plant roots, and the rhizosheric soil. Interactions of a plant with electromagnetic radiation have been explored, but easy, safe, clean and efficient eradication meeting certain requirements has been heretofore elusive.

In this disclosure, the plant root crown, as discussed below, figures importantly.

In the prior art, basic thermal and mechanical techniques to eliminate nuisance vegetation are not sufficiently effective for use as a commercially viable eradication program or system. This includes

[1] basic pulling of plant stems, roots, or other plant components to induce tensile failure, such as by natural events like feeding of cows and other ruminants;

[2] tensile failure below ground surface or soil grade;

[3] severing action or cut action, such as by gnawing or eating by an animal;

[4] cutting using a cutting tool or machine such as a chain saw;

[5] surface trauma delivered to plant root epidermis and cortex, such as lacerating or abrasion of the epidermis and possibly the cortex of a root, such as done by a gnawing animal, or by trauma delivered by a shovel blade or other tool; or

[6] needle wounds, which lend themselves to repair using latex or other healing substances that are dispatched to the scene of the wound, often originating from the xylem layer to transport needed enzymes and healing tars.

Biological responses to unnatural illumination can be counter-intuitive and complex, and there are many phenomenological findings discovered.

Now referring to FIG. 1, a schematic representation of a general electromagnetic spectrum for wavelengths of radiation of significance that are potentially incident upon a plant, with wavelengths ranging from 1 mm to less than 100 nm is shown. In the infrared portion, or heat radiation portion of the electromagnetic spectrum, there are subdivisions for Far-Infrared (FAR), mid or Medium Wavelength Infrared (MWIR) and near-infrared (NEAR) all in total ranging from 1 mm to 700 nm or 0.7 microns. Visible light (Visible Light) is commonly taken to range from 700 nm to 400 nm. Ultraviolet (Ultraviolet) radiation is generally taken to be of wavelength less than 400 nm, with near-ultraviolet further divided according to some consensus into known portions UV-A (400-320 nm), UV-B (320-280 nm) and finally, UV-C (280 nm-100 nm) which is extremely dangerous for humans and is often used as a germicidal radiation to purify water and kill bacteria, viruses, and other organisms.

There are competing standards for labeling portions of the electromagnetic spectrum, as promulgated by ISO (International Organization for Standardization); DIN, Deutsches Institut für Normung e.V. (German Institute for Standardization) and others.

It is important to note that in this disclosure and the appended claims, these and certain other subdivisions shall have particular meanings assigned here and will be defined herein in the Definitions Section.

Now referring to FIG. 2, a cartesian plot of both unfiltered solar radiation and net (ground) solar radiation is shown, with spectral radiance in watts per square meter per nanometer versus wavelength in nanometers (nm) is shown. Photosynthesis in plants makes use of visible light, especially blue and red visible light, and ultraviolet light, to varying degrees, depending on a host of factors including plant species and type, radiation exposure history, chloroplast type, internal plant signaling, light exposure history, and other factors. Nearly all the infrared radiation in sunlight is essentially in the region in or about near infrared (NIR), and shorter than 4 micrometers.

Approximately seven percent of the raw electromagnetic radiation emitted from the sun is in a UV range of about 200-400 nm wavelengths. As the solar radiation passes through the atmosphere, ultraviolet or UV radiation flux is reduced, allowing that UV-C ("shortwave") radiation (200-280 nm) is completely absorbed by atmospheric gases, while much of the UV-B radiation (280-320 nm) is additionally absorbed by stratospheric ozone, with a small amount transmitted to the Earth's surface. Solar UV-A radiation (320-400 nm) is essentially, for practical purposes, not absorbed by the ozone layer. As mentioned below, UV-B and UV-C radiation have been suggested to effect eradication of plants.

Plants tend to respond to UV-B irradiation and also to excessive visible light by stimulating protection mechanisms or by activating repair mechanisms to reduce injury and perform repair.

A common protective mechanism against potentially damaging irradiation is the biosynthesis of UV absorbing compounds, which include secondary metabolites, mainly phenolic compounds, flavonoids, and hydroxycinnamate esters that accumulate in the vacuoles of epidermal cells in response to UV-B irradiation. These compounds attenuate UV-B range radiation and protect the inner or deeper cell layers, with little absorptive effect on visible light.

UV-B radiation is considered highly mutagenic, with plant DNA particularly sensitive. UV-B radiation causes deleterious phototransformations and can result in production of cyclobutane pyrimidine dimers (CPDs) and pyrimidine (6-4) pyrimidinone dimers (6-4 Pps). DNA and RNA polymerases are generally not able to read through these photoproducts and the elimination of these cytotoxic compounds is essential for DNA replication and transcription and for plant survival. To cope, most plants have developed repair mechanisms including photoreactivation, excision, and recombination repair. Photoreactivation is a light-dependent enzymatic process using UV-A and blue light to monomerize pyrimidine dimers: Photolyase binds to the photoproducts and then uses light energy to initiate electron transfer to break the chemical bonds of cyclobutane rings and restore integrity of the bases.

It is now known that plant roots also are simply generally sensitive to UV-B light levels, such as via the action of the gene RUS1, and can pass this information on to other parts of a plant responsible for growth and development. Low dosages of UV-B light can provide important signals to the rest of the plant and can be beneficial to plant growth, helping young plants develop in a timely way, and helping promote seedling morphogenesis. For long term exposure of weeks' duration, too much UV-B light can be toxic to some plants. However, any resulting lethality is not suited for meeting the purposes served by the instant invention, as discussed below.

The allelopathic behavior of plants can be influenced by exposure to added (artificial) UV-B radiation [ref: "Allelopathic Influence of Houndstongue (Cynoglossum officinale) and Its Modification by UV-B Radiation," Nancy H. Furness, Barbara Adomas, Qiujie Dai, Shixin Li, and Mahesh K. Upadhyaya; Weed Technology 2008 22:101-107].

Importantly, UV-B radiation can trigger biochemical steps to activate internals processes such as wax production to provide a plant with protection against further ultraviolet radiation [ref: "A UV-B-specific signaling component orchestrates plant UV protection," Brown B A, Cloix C, Jiang G H, Kaiserli E, Herzyk P, Kliebenstein D J, Jenkins G I; Proc Natl Acad Sci USA. 2005 Dec. 13; 102(50):18225-30. Epub 2005 Dec. 5]. Plant epidermal flavonoids can protect the photosynthetic apparatus from UVB-mediated damage [ref: "Protection of the D1 photosystem II reaction center protein from degradation in ultraviolet radiation following adaptation of Brassica napus L. to growth in ultraviolet-B," Wilson, M. I. and B. M. Greenberg (1993) Photochem. Photobiol. 57, 556-563] [ref: "A flavonoid mutant of barley (Hordeum vulgare L.) exhibits increased sensitivity to UV-B radiation in the primary leaf," Reuber, S., J. F. Bornman and G. Weissenbo"ck (1996) Plant Cell Environ. 19, 593-601]. It is illustrative to examine how plants deal with large infrared and ultrviolet/visible light exposures.

Now referring to FIG. 3, a partial schematic representation of a class of prior art plant eradication using various large infrared radiative transfers is shown. A plant Y with root R is shown receiving a large infrared radiative transfer from a forest fire, or any number of prior art infrared radiation-producing processes listed as shown, such as via a flame, an incandescent body, a hot gas, vapor (e.g., steam) or fluid, or via contact with a hot body, or via ordinary high intensity destructive exposure to known IR or infrared radiators.

Because of the their inherited ability to withstand forest fires and lightning strikes, most plants do not respond in large numbers to application of heat as given in the prior art. Application of thermal contactors or applicators have not met with success. The heat thus delivered is ineffective or can be sometimes be beneficial or stimulative, with any resultant subsequent repair to a root often making the root and plant more robust to future thermal trauma.

Application of thermal energy and high doses of radiant energy have been shown in the prior art to burn, incinerate, discolor, or render useless above-ground plant components. Whether or not those same plants grew back, however, is often left unstated in prior art disclosures.

FIG. 3, which shows schematically as an example a FIRE impinging upon plant Y and/or root R, is followed by FIG. 4 showing a burned root with a burned stump as shown, such as might be found after a forest fire, with combustion byproducts, volatilized proteins or smoke SS rising from the stump as shown. Even obliterating plant Y above ground in this manner typically results in the response shown in FIG. 5, which shows Regrowth as shown.

It is not sufficient merely to damage certain components of a plant, such as causing senescence or incineration of above-surface foliage. While visible above-ground damage may be desirable or gratifying for an operator of a eradication machine, actual lethality can be short of expectations and short of what is required for a successful eradication system, particularly for agricultural applications where fast-growing species can regenerate in a matter of weeks.

For example, prior art U.S. Pat. No. 5,189,832 to Hoek et al., discloses gas-fired burners which are directed at nuisance vegetation along a ground plane. This and other prior art methods which burn or heat plant parts usually fail, because plants have evolved to tolerate—and sometimes be stimulated by, forest fires and lightning strikes.

Similarly, when propane burners and heated ceramics burn off foliage, root structure remains among plants, and many plants regrow. Soil is an excellent thermal insulator both because of the presence of what are essentially refractory materials such as silica, sand, igneous rock particles, and the like—and also because of air content, moisture content, and because of its high thermal mass.

It has been found through experimentation that It takes approximately one hour for a 8000 btu/hour output propane torch to have significant thermal effects 2.5 cm into bulk soil. Common nuisance vegetation such as Digitaris sanguinalis in the crabgrass family, for example, is difficult to kill, regenerates easily after pulling, and is resistant to chemicals and thermal trauma.

Many weeds such as crabgrass are fairly transparent to UV-C and the lethality of UV-B for short term applications of low energy is small in degree and not sufficient for a commercially successfully eradication method.

Now referring to FIGS. 6 and 7, there is depicted one typical class of prior art eradication processes or occurrences whereby extreme ultraviolet light induced trauma is delivered with a large UV radiative transfer via general illumination or flash onto a naturally grown species Digitaria sanguinalis rooted into a soil grade as shown. The radiation shown in FIG. 6 is shown for illustrative purposes, ranging from visible light, through UV-A, UV-B and UV-C and beyond, into what is known as Far Ultraviolet, extremely virulent and dangerous forms of radiation.

First, it should be noted that with the various protection mechanisms that plants employ, added amounts of UV radiation are quite often ineffective, either wholly or in practice, for a suitable eradication process. When plants are normally in sunlight, they tend to develop a waxy layer on their leaves and other similarly exposed components. These plants tend to be resistant to UV radiation. In particular, monocots and dicots have protective cells, including a well-developed epidermis which comprises a waxy layer on top, called the cuticle. This waxy surface protects the leaves from sunburn, dessication (drying out) and reduces attacks by fungi, bacteria, virus particles and insects. This layer prevents what is called sunscald.

When moderate levels of UV radiation are used to attempt to clear nuisance vegetation, leaves can turn white in color as the radiation breaks down connections of layers, and as a result, the leaf is unable to conduct photosynthesis. Leaf components can die. However, the root structure remains, and the plant usually is able to adapt as after a forest fire, which inflicts similar radiation damage.

Evaluating the effect of artificial illumination on nuisance plants can be complex, with competing and conflicting effects and factors. Prior art techniques have not been successful, overall. In many cases, added illumination in the form of general UV rays containing UV-A, UV-B and UV-C frequencies has been found to give benefits. Inconsistencies in prior art research findings are due to differing plant biology and genetics; soil conditions; and ambient light, e.g., shady versus sunny conditions.

There are many engineering considerations that figure importantly in determining the success of an eradication system using illumination. Among the many other factors in play when using artificial illumination to attempt eradication of nuisance plants are:

[1] Actual operative (beneficial versus detrimental) result from illumination stress
[2] Effectiveness, such as expressed lethality in percent dead after 30 days
[3] Total required input energy
[4] Time of Exposure and speed of operations. Increased speed is part of the subject of this disclosure.
[5] Infrared levels, visible light levels, UV-A levels, UV-B levels, and UV-C levels
[6] Lamp or light source system complexity, cost, the need for controls, ballasts, and operator safety guards
[7] Operator and bystander safety, specifically often regarding infrared and UV exposure danger. This is a significant disadvantage for prior art methods such as that disclosed in U.S. Pat. No. 5,929,455 to Jensen, which discloses an eradication method using high energy radiation, high in UV-B and especially UV-C radiation, which is dangerous and mutating. Jensen '455 uses very high applied power.

[8] Mutagenic effects from UV-B and UV-C to life forms at ground surface and into bulk soil. Although some mutagenic activity has been observed for even visible light, there is a steep exponential drop in mutagenic activity and effect for radiation over 320 nm wavelength.

[8] Ignition hazards, lamp unit operating temperatures, and cost of operation

A successful eradication system will develop and meet high benchmarks regarding these factors. While some effectiveness has been found using prior art methods, it has only been effective for very large and dangerous radiative transfers. The reason why these dangerous and very high energy transfers have been used is because prior art low energy methods have not worked.

The method described by Kaj Jensen in U.S. Pat. No. 5,929,455 uses an extremely high energy, dangerous process, specifically using UV-B and UV-C which have very high and special, qualitatively different, lethality. Interestingly, certain species such as crabgrass are fairly transparent to it for low dosages. Jensen '455 uses no other kind of light and employs a high pressure mercury (Hg) vapor lamp with a strong 254 nm UV-C emission line and no intervening phosphor. Such emissions, including similar emissions lines from other selected arc discharge lamps are very dangerous, expensive and require extensive controls and safeguards. Jensen '455 uses dosages very far greater than 10,000 joules per square meter merely to stop or retard growth dependent on the type and size of the plant. Actual attempts at lethality for a successful eradication process for the type of radiation Jensen '455 arrays involves many tens of thousands of Joules per square meter exposure.

This type of high energy exposure of UV rays, along with infrared and visible light, to kill life, including plant life, is known since at least the mid-20th century. During World War II and also during tests in decades after, it became known that certain high energy depositions of UV-B and UV-C radiation onto land kills vegetation—and it is energies in this regime, in terms of total Joules of deposited UV energy—that Jensen '455 uses.

The world's first hydrogen bomb test, conducted by the United States in the Bikini Atoll in March, 1954, had unprecedented explosive power, an equivalent explosive yield of as high as 15 Megatons of TNT (Trinitrotoluene). By contrast, the blasts at Hiroshima and Nagasaki in Japan in August, 1945 yielded an estimated 16,000 tons and 21,000 tons, respectively. Radiation effects from these blasts received very high attention and study.

According the Radiation Effects Research Foundation (RERF), a non-profit organization conducted in accord with an agreement between the governments of Japan and the United States, initial radiation effects were assessed by the Atomic Bomb Casualty Commission (ABCC) established in 1947, which was later re-organized into the RERF in 1975. This included extremely extensive and detailed epidemiological studies of health and longevity on more than 120,000 affected individuals, with research conducted for over fifty years. It also included detailed observations of effects on plants and animal life.

From the discoveries made after the bombing of Hiroshima and Nagasaki, regarding the effects on plant life from the measured emissions of electromagnetic (light) radiation, the application of a high amount of UV, including UV-A, UV-B and UV-C, to kill plants appears to be known. Generally, the energy of a typical atomic bomb is distributed roughly as 50% blast pressure, 35% as heat, and 15% as radiation (all types).

During the two atomic bomb blasts of 1945, the greatest number of radiation injuries was deemed to be due to ultraviolet rays. The origination of the ultraviolet rays comes from the extremely high temperature flash of the initial reaction in the detonated atomic bomb. These rays cause very severe flash burns and they were well known to have killed plant life. The radiation comes in two bursts: an extremely intense "flash" discharge lasting only 3 milliseconds, and a less intense one of longer duration, lasting several seconds. The second burst contains by far the larger fraction of total light energy, over ninety percent.

The first flash or discharge is especially rich in ultraviolet radiation, which is very biologically destructive. The total deposition energy of the initial flash alone is such that, with no time for heat dissipation, the temperature of a person's skin would have been raised 50 C by the flash of visible and ultraviolet rays in the first millisecond at a distance of just under 4000 meters from the blast zone.

This research was conducted by the Manhattan Atomic Bomb Investigating Group, formed on 11 Aug. 1945, two days after the bombing of Nagasaki, via a message from Major General Leslie R. Groves to Brigadier General Thomas F. Farrell. The biological effects of high amounts of UV radiation on plant life were especially obvious and pronounced by examining the aftermath of the first hydrogen bomb test on the Bikini Atoll.

Young naval officers on deck of the USS Bairoko witnessed, while in the Bikini Atoll about 50 km from the hydrogen bomb blast site, an intense flash followed by a longer radiation burst of some seconds duration, in turn followed by heavy, warm, blast-driven winds. The ultraviolet radiation from the flashes was sufficient to kill fish deep underwater, as evidenced by many varied fish floating to the surface, with bodies burned on one side or region, from incident UV rays. The ultraviolet radiation also killed plant life over a very large area. Various measurements were retained even though the blast destroyed many instruments that were set up in permanent buildings to measure it.

From the standpoint of acceptable lethality for a success eradication process, all low energy previous prior art techniques have fallen short and have not been acceptably effective. Speed of application and overall success rate are very important. Generally, the delivery of trauma which resembles natural trauma (e.g., severing, pulling, application of heat etc.) is not effective as bona fide reliable eradication methods, because the plants so treated tend to heal and regenerate, probably as a result of centuries of evolution. The delivery of illumination trauma in the low energy regime as attempted in the prior art is similarly not effective. High dosages of radiation that serve to scald, burn or incinerate a plant ironically result in regrowth as shown in the instant FIGS. 3-5, as they resemble a forest fire, addressed by centuries of evolution among plants. Also, many prior art discoveries regarding application of artificial radiation to plants often exist ostensibly to serve another other objective, such as benefitting the plant, by stimulating growth, removing pathogens or insects, etc.

Reference is now made to U.S. Pat. No. 8,872,136, issued 28 Oct. 2014 to Jackson, et. al., application Ser. No. 13/553, 79. The entire disclosure of this prior issued patent, Jackson 8,872,136 is hereby incorporated herein by reference in its entirety and its subject matter arises from the same owner and obligation to assign.

In U.S. Pat. No. 8,872,136 to Jackson et al., a substantially non-invasive low-energy low irradiance non-mutating method is taught and claimed for eradicating a plant in a time under one minute, using a Rapid Unnatural Dual Component Illumination Protocol (RUDCIP) with illumination about the plant—but a different eradication method is given from that disclosed and claimed in the instant disclosure—different aiming, different wavelengths, and different protocol are given.

Jackson 8,872,136 discloses an above-ground foliage and root crown damage illumination component comprising exposure using near-IR radiation directed to the foliage of the plant and/or its root crown—along with a ground-penetrating UV-A illumination component, with UV-A radiation directed to the root crown of the plant and/or the soil grade immediately adjacent the root crown of the plant.

Of further interest and relevance in the instant disclosure are metabolic and signaling processes associated with photosynthesis and plant regulation, growth and self-protection. One main organelle, the chloroplast, figures importantly.

Chloroplasts, the organelles responsible for photosynthesis, are metabolic generators, contain self-supporting genetic systems, and they can replicate. They are also highly dynamic and circulate within plant cells, and their operative metabolic behavior is strongly influenced by light color and intensity. Plant chloroplasts are large organelles (typically 5 to 10 microns (μm) in their longest dimension and comprise a double membrane chloroplast envelope, and also a third internal envelope, the thylakoid membrane. The thylakoid membrane forms a network of flattened thylakoids, which frequently are arranged in stacks.

It is well known that plants use blue and red light as primary drivers for photosynthesis, as well as to serve as signals and alarms for needed internal changes. A plant blue light response was documented as early as 1881 by Charles Darwin when he discovered what is now known as the blue light-induced phototropic response. Commercially available "grow" lamps use blue light as part of a distribution of wavelengths for maximum growth and viability. If excess light is given to a plant, stress can occur.

Generally, inside chloroplasts, abiotic stresses such as drought, high light, high temperatures, and salinity induce a reduction in $CO_2$ takeup, and increased reactive oxygen species (ROS), which can lead to leaf senescence and yield loss. Plants have multiple mechanisms to either prevent the formation of ROS or eliminate them. However, it is important to note that leaf senescence is not same as plant senescence, dying, or eradication.

Reactive oxygen species are eliminated rapidly by internal antioxidative systems, and the chloroplast uses hydrogen peroxide levels to regulate thermal dissipation or elimination of excess light input energy, as managed by known photosynthetic electron transport mechanisms. Reactive oxygen species are also used to signal alarms inside plants, to regulate metabolism, gene expression and other factors to deal with stresses, including exposure to UV-A radiation. There are other mechanisms that employ light in plants, such as by various photoreceptors. Phytochromes are sensitive to red and infrared light and may act as temperature sensors. Phytochromes regulate the germination of seeds, synthesis of chlorophyll itself, and growth and development of seedlings, and onset of flowering. Cryptochromes are flavoproteins that are respond to blue and UV-A light, and influence circadian rhythms. Finally, phototropins are flavoproteins that mediate phototropism responses in higher plants, such as those notably observed by Charles Darwin in 1881.

Red light plays a role in many plants but regarding the instant invention, red light irradiation was found not effective, and addition of red wavelengths to the protocol taught and claimed in the instant disclosure had no perceptible increase in effectiveness when compared to a control group.

SUMMARY OF THE INVENTION

A different, subtle but effective way to eradicate or stress plants with optical and thermal/optical trauma with high effective lethality was discovered using unexpectedly low input energy and short exposure times using safe radiation. The invention uses specific aiming and a combination of irradiances not taught or suggested by the prior art.

The instant invention uses a dual component, low energy, unnatural set of irradiances, with an Indigo Region Illumination Distribution of light that can extend from 300 nm (UV-A) to midway in the visible spectrum (550 nm) to be directed to plant foliage and/or a plant root crown, and a Medium Wavelength Infrared distribution of light, ranging from 2-20 microns wavelength to be directed to the ground, to a plant root crown and/or soil immediately adjacent to the root crown.

This represents a wholly new discovery distinct from Jackson 8,872,136, and allows eradication and/or control to be accomplished in half the time, e.g., 5 seconds instead of ten. In addition to quicker application and faster operation, the teachings of the instant invention use less energy. For certain embodiments, energy used has been reduced from 400 watts to 120 watts. The invention also provides for preferred embodiments that allow for novel compact configurations, such as a proximity pass-through configuration and a proximity reflect-through configuration, that provide both irradiances together in a compact illuminator package, as disclosed further below.

The instant invention uses Medium Wavelength Infrared radiation, with wavelength most broadly from 2-20 microns, preferably 2.4-8 microns and more preferably for certain embodiments, 3-5 microns. Photoreceptors in the human eye have low sensitivity to this type of infrared radiation.

The invention comprises a high speed, substantially non-invasive, low-irradiance method for eradicating a plant via signaling in a treatment time under one minute, using indigo region illumination and medium wavelength infrared illumination about the plant, the method comprising any of [A], [B], [C] and [D]:

[A] a full IRID twin component exposure, directed for eradicating a plant that is in a vegetative or later phase, comprising:

[A1] Exposing any of a foliage of the plant and a root crown of the plant to an Indigo Region Illumination Distribution (IRID) of an average irradiance $E_{IRID}$ between 0.125 W/cm² and 2 W/cm² during at least a portion of the treatment time, to provide a foliage and root crown illumination A1 exposure;

[A2] Exposing any of a root crown of the plant and a soil grade immediately adjacent the root crown to infrared radiation that is substantially Medium Wavelength Infrared (MWIR) radiation of an average irradiance $E_{MWIR}$ between 0.045 W/cm² and 0.72 W/cm² during at least a portion of the treatment time, to provide a root crown and soil grade illumination A2 exposure; the exposures A1 and A2 for respective times that together allow the signaling, but not sufficient together to cause substantial high temperature thermally-induced leaf and plant component failure during the exposures;

[B] a low IRID summed twin component exposure, with compensating MWIR, directed for eradicating a plant that is in a vegetative or later phase, comprising:

[B1] Exposing any of a foliage of the plant and a root crown of the plant to an Indigo Region Illumination Distribution (IRID) of an average irradiance $E_{IRID}$ between 0.05 W/cm² and 0.125 W/cm² during at least a portion of the treatment time, to provide a foliage and root crown illumination B1 exposure;

[B2] Exposing any of a root crown of the plant and a soil grade immediately adjacent the root crown to infrared radiation that is substantially Medium Wavelength Infrared (MWIR) radiation of an average irradiance $E_{MWIR}$ such that the sum of the Indigo Region Illumination Distribution average irradiance $E_{IRID}$ from step [B1] and the Medium Wavelength Infrared (MWIR) radiation of an average irradiance $E_{MWIR}$ is at least 0.25 W/cm$^2$ and less than 7 W/cm$^2$ during at least a portion of the treatment time, to provide a root crown and soil grade illumination B2 exposure; the exposures B1 and B2 for respective times that together allow the signaling, but not sufficient together to cause substantial high temperature thermally-induced leaf and plant component failure during the exposures;

[C] a saturation twin component exposure, directed for eradicating a plant that is in a vegetative or later phase, comprising:

[C1] Exposing any of a foliage of the plant and a root crown of the plant to an Indigo Region Illumination Distribution (IRID) of an average irradiance $E_{IRID}$ of at least 0.125 W/cm$^2$ during at least a portion of the treatment time, to provide a foliage and root crown illumination C1 exposure;

[C2] Exposing any of a root crown of the plant and a soil grade immediately adjacent the root crown to infrared radiation that is substantially Medium Wavelength Infrared (MWIR) radiation of an average irradiance $E_{MWIR}$ such that the sum of the Indigo Region Illumination Distribution average irradiance $E_{IRID}$ from step [C1] and the Medium Wavelength Infrared (MWIR) radiation of an average irradiance $E_{MWIR}$ is at least 0.125 W/cm$^2$ and less than 7 W/cm$^2$ during at least a portion of the treatment time, to provide a root crown and soil grade illumination C2 exposure; the exposures C1 and C2 for respective times that together allow the signaling, but not sufficient together to cause substantial high temperature thermally-induced leaf and plant component failure during the exposures;

[D] a twin component exposure, directed for eradicating a seedling, comprising:

[D1] Exposing any of a foliage of the plant and a root crown of the plant to an Indigo Region Illumination Distribution (IRID) of an average irradiance $E_{IRID}$ between 0.1 W/cm$^2$ and 1 W/cm$^2$ during at least a portion of the treatment time, to provide a foliage and root crown illumination D1 exposure;

[D2] Exposing any of a root crown of the plant and a soil grade immediately adjacent the root crown to infrared radiation that is substantially Medium Wavelength Infrared (MWIR) radiation of an average irradiance $E_{MWIR}$ between 0.035 W/cm$^2$ and 0.35 W/cm$^2$ during at least a portion of the treatment time, to provide a root crown and soil grade illumination D2 exposure; the exposures D1 and D2 for respective times that together allow the signaling, but not sufficient together to cause substantial high temperature thermally-induced leaf and plant component failure during the exposures.

The method can also additionally comprise heating an MWIR emitter (E) to produce at least a portion of the Medium Wavelength Infrared radiation, and the MWIR emitter can also be heated to a temperature between 400 F and 1000 F to produce at least a portion of the Medium Wavelength Infrared radiation. The MWIR emitter can comprise glass such as selected from borosilicate glass, and soda lime glass.

The exposures of [A], [B], [C] and [D] can have a duration of 7 seconds or less in total, or 2 seconds or less in total.

The Indigo Region Illumination Distribution can comprise radiation in the range of 420-480 nm wavelength, or alternatively, 400-500 nm wavelength, and additionally, one can superpose at least a portion of Indigo Region Illumination Distribution and the Medium Wavelength Infrared radiation to allow them to be so directed at least partly together.

The method also can comprise creating a proximity pass-through configuration by passing a portion of the Indigo Region Illumination Distribution through a MWIR emitter (E) that provides at least some of the Medium Wavelength Infrared radiation.

The method can also comprise directing at least a portion of the Indigo Region Illumination Distribution so as to reflect off a surface before emerging to be so directed. Also, a proximity reflect-through configuration can be achieved using the invention by making at least a portion of the Indigo Region Illumination Distribution reflect off a surface before emerging to be so directed and superposing at least a portion of the Indigo Region Illumination Distribution and the Medium Wavelength Infrared radiation to allow them to be directed at least partly together. The invention can also additionally comprise heating an MWIR emitter to produce at least a portion of the Medium Wavelength Infrared radiation, where the MWIR emitter comprises a powder coat, and the powder coat can be optically excited via a radiant source (HL) external thereto. The powder coat can comprise a glass, such as glass selected from borosilicate glass, and soda lime glass.

The method can also comprise directing the exposures for the Indigo Region Illumination Distribution and the Medium Wavelength Infrared radiation at least partly simultaneously.

The method also can comprise locating the plant using machine recognition, and performing the method on the plant so located.

The invention also relates to a high speed, substantially non-invasive, low irradiance method to apply stress to a plant in a time under one minute, using indigo region illumination and medium wavelength infrared illumination about the plant, the method comprising any of exposures [A], [B], [C] and [D], as given above, and similarly can be supplemented by the additional optional method features listed above following the descriptions of exposures [A], [B], [C] and [D]. Also, this method can additionally comprise an additional step whereby, based upon a plant response to exposures corresponding to any of [A], [B], [C] and [D], one can further select a plant for one of retention, treatment, eradication or neglect.

The invention also includes a non-invasive, low-irradiance proximity illuminator (10) providing an Indigo Region Illumination Distribution (IRID) and Medium Wavelength Infrared (MWIR) radiation about a plant during a treatment time, with the illuminator comprising:

[a] A foliage and root crown illumination source comprising an IRID emitter (88), the IRID emitter so formed, constructed and operable to expose any of a foliage of the plant and a root crown of the plant to the Indigo Region Illumination Distribution (IRID) of an average irradiance $E_{IRID}$ to be any of between 0.125 W/cm$^2$ and 2 W/cm$^2$, between 0.05 W/cm$^2$ and 0.125

W/cm², between 0.125 W/cm² and 6.875 W/cm², and between 0.1 W/cm² and 1 W/cm²; and

[b] A root crown and soil grade illumination source comprising an MWIR emitter (E) so formed, constructed and operable to expose any of a root crown of the plant and a soil grade immediately adjacent the root crown to infrared radiation that is substantially the Medium Wavelength Infrared (MWIR) radiation of an average irradiance $E_{MWIR}$ to be any of between 0.045 W/cm² and 0.72 W/cm², between 0.25 W/cm² and 6.95 W/cm², between 0 W/cm² and 7 W/cm², and between 0.035 W/cm² and 0.35 W/cm²;

with the IRID emitter and the MWIR emitter each so further sized, positioned and oriented to allow signaling the plant, but with the Indigo Region Illumination Distribution (IRID) and Medium Wavelength Infrared (MWIR) radiation not sufficient together to cause substantial high temperature thermally-induced leaf and plant component failure, and so constructed to allow that at least some light output from each of the IRID emitter and MWIR emitter to be substantially superposed for directing to the plant.

As in the method, the illuminator can have the IRID emitter and the MWIR emitter further each so sized, positioned and oriented to offer a proximity pass-through configuration whereby at least some of the light output from the IRID emitter passes through the MWIR emitter. The illuminator can comprise a thermal shield so sized, positioned and oriented to reduce thermal back-emission from the MWIR emitter to the IRID emitter, the thermal shield comprising at least one of an IR-reflector and an IR-insulator, and the MWIR emitter additionally can also comprise a glass selected from borosilicate glass, and soda lime glass, as well as additionally comprise a heater in thermal communication with the glass.

The illuminator can also be configured wherein the IRID emitter is further positioned to allow at least some of the light output therefrom to reflect off a surface before emerging from the illuminator, and that surface can optionally comprise at least part of the MWIR emitter. The MWIR emitter can comprise a powder coat, and can optionally be excited by a radiant source to heat the powder coat. The powder coat itself can comprise a glass selected from borosilicate glass, and soda lime glass.

BRIEF DESCRIPTION OF THE DRAWINGS

FIG. 3 shows a partial schematic representation of a class of prior art plant eradication using incineration via various large infrared radiative transfers;

FIGS. 4 and 5 show partial cross sectional, partial surface views of a plant in soil, with a root structure in soil, with regrowth after a typical large infrared radiative transfer as depicted in FIG. 3;

FIG. 18 shows an oblique view of a proximity pass-through configuration illuminator according to the invention, with a ¼ cylindrical cut-out showing cross-sections;

FIG. 19 shows the proximity pass-through configuration illuminator of FIG. 18, with Indigo Region Illumination Distribution and Medium Wavelength Infrared rays trained upon a seedling;

FIG. 21 shows a listing of operative attributes for a class of prior art large radiative and large UV radiative transfers as depicted in FIGS. 6, 7, and 8;

FIG. 27 shows a schematic arrangement using separate MWIR and IRID sources used to irradiate a plant or seedling;

FIG. 28 shows a schematic series of apparatus and process components for using the teachings of the instant invention with machine recognition and automated processes;

FIG. 29 shows a schematic representation of a mobile unit of the machine recognition embodiment depicted in FIG. 27, showing communication to an imager;

FIG. 30 shows a listing of possible adaptive stress vectors upon a plant including those which can arise while practicing the instant invention.

DEFINITIONS

Figure 1:
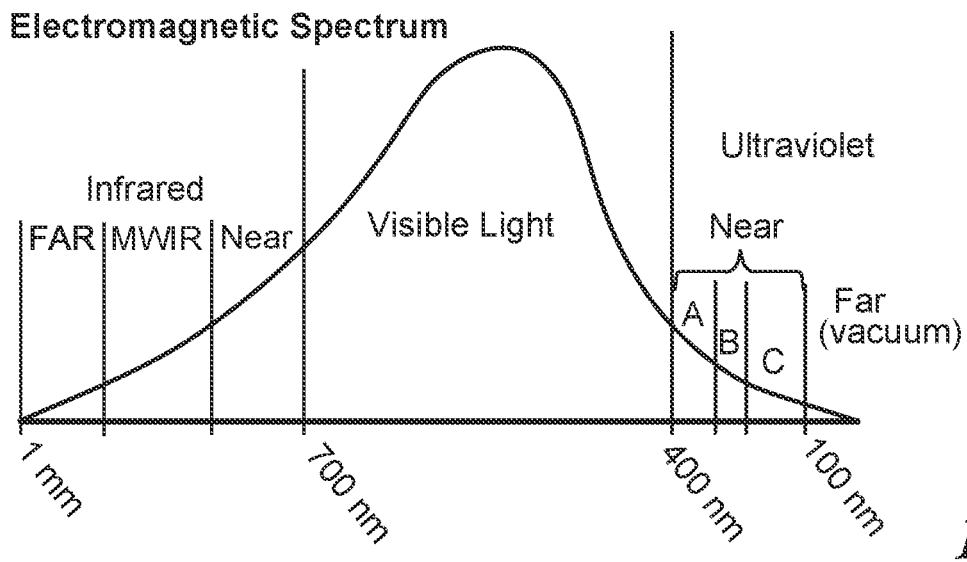
FIG. 1 shows a schematic representation of a general electromagnetic spectrum for wavelengths potentially incident upon a plant, with wavelengths ranging from 1 mm to less than 100 nm.
Figure 2:
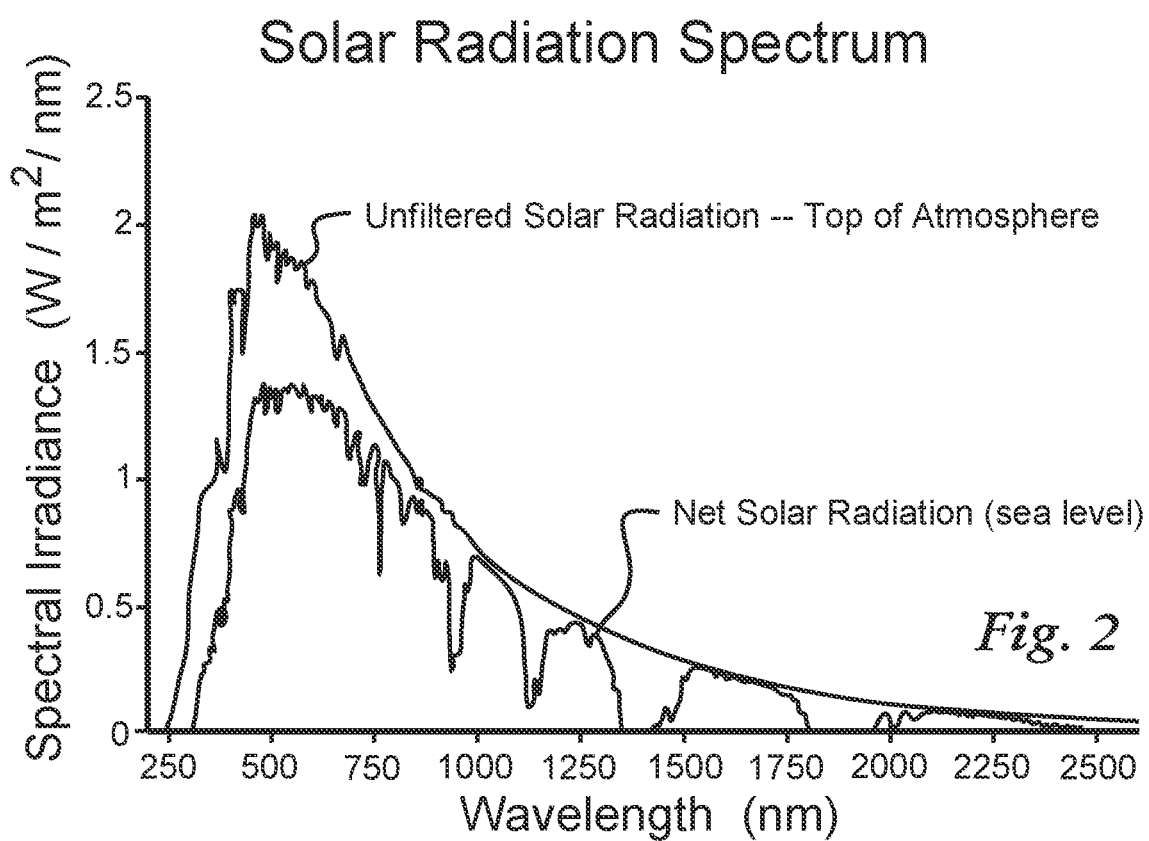
FIG. 2 shows a typical natural filtered and unfiltered solar radiation spectrum using a cartesian plot of spectral radiance versus wavelength.

The following definitions shall be used throughout:

Average Irradiance—shall refer to a power level of irradiance at taught for the instant invention which is achieved at some time, such as a sub-portion of the total treatment time and not necessarily all the time, during exposure treatment of a plant or use of the instant invention. It is understood that those of ordinary skill in the art can modulate power levels to achieve many varied objectives, and flashes or low level or high level exposures can be used. For example, during a 2 second treatment, an exposure consisting of four flashes active during $1/10$ of the exposure time, such as four 0.05 second duration flashes for a total of 0.2 seconds at a 10 W/cm² irradiance would work out to 1 W/cm² average irradiance, if calculated over the whole time of 2 seconds. This definition shall thus preclude the avoidance of claims by merely changing exposure levels to avoid the average irradiances for Indigo Region Illumination Distribution IRID and Medium Wavelength Infrared MWIR as taught and claimed.

Directed, directing—shall denote any net transmission of electromagnetic radiation as taught and claimed here, whether by direct illumination or via reflection or indirect transmission, such as via use of mirrors, light guides, via refraction, or incidental reflection or absorption and re-transmission through any material body, or through a plant under treatment, or a plant adjacent to a plant under treatment, such as light passing between or through foliage of one plant to another plant, seed, or seedling.

Eradicate—can include death, eventual death, damage or stress to an adult plant, seedling or seed, and at least partial disruption or delay of the germination of a plant or seed. Multiple applications of the instant invention, such as lower dose applications can be contemplated whereby desired eradication yield increases upon multiple applications or passes.

Exposure—shall be that due to radiative transfer over and above that provided by natural sunlight or equivalent ordinary ambient light received by plants unassisted by use of the instant invention.

Foliage—shall denote all parts of a plant above soil grade, generally excluding root structures, and shall include components such as stems and leaves.

Heat/Heated/Heater/Heating—shall include all thermal production and transfer, from any heat source, via contact or conduction; convection; or radiation. This can include flame heaters or propane heaters as those of ordinary skill in the art can specify.

Illumination—shall be interpreted broadly and shall include all manner of radiative processes as defined by the appended claims, and shall not be limited to lamp outputs, but rather shall encompass any and all radiation afforded by physical processes such as incandescence or any light emission process such as from a light emitting diode (LED); flames, such as from propane burners; or incandescence from hot masses, such as gases, fluids, steam, metal knives or hot infrared emitters—and can encompass multiple sources.

IRID—Indigo Region Illumination Distribution ("blue")—shall denote a preferred range of frequencies, such as emitted by commercially available blue LED (light emitting diode) light sources with emission peaks named "royal blue" that denote a possible range of wavelengths that serve the instant invention. This definition shall include an Indigo Region Illumination Distribution to be defined to be any of the following wavelength ranges:

[1] A preferred range: 420-450 nm; [2] a larger preferred range of 420-480 nm; [3] a larger preferred range of 400-500 nm; [4] a yet larger preferred range of 400-550 nm; [5] and a broad range of 300-550 nm. This "indigo band" does not have to include indigo or blue or any particular "color" and does not have to include wavelengths in the preferred range of—wavelengths of 420-450 nm that are commonly assigned to indigo or near indigo as human perceptions. The addition of light for any reason, including for a trademark or appearance effect, e.g., aquamarine, shall not affect this definition. The frequency range as defined interestingly typically includes a first common photochemical efficiency peak for plants, as discussed in the description for FIGS. 11 and 12.

An Indigo Region Illumination Distribution IRID can include monochromatic, multichromatic frequency/wavelength lines or bands, continuous or non-continuous distributions, and distributions that comprise one of more emission lines, or distributions that are absent the general wavelength or frequency for which it is named, i.e., a distribution that is absent wavelengths generally given for indigo, that is, absent approximately 420-450 nm. Metamerism and the response of the human visual system to identify or form color perceptions shall not narrow this definition.

IRID Emitter (88)—shall denote any light producing device that has the requisite electromagnetic output properties to help produce an Indigo Region Illumination Distribution IRID that allows service to the instant invention as described in the appended claims, and can be an LED array IRID emitter 88, a laser, or an excited material body. An IRID emitter and a MWIR emitter can be combined into one body or component, or device.

Medium Wavelength Infrared—MWIR—has been variously defined by different organizational bodies, sometimes using different terms. For example In the CIE division scheme (International Commission on Illumination), CIE recommended the division of infrared radiation into the following three bands using letter abbreviations: IR-A, from 700 nm-1400 nm (0.7 µm-1.4 µm); IR-B, from 1400 nm-3000 nm (1.4 µm-3 µm); and IR-C from 3000 nm-1 mm (3 µm-1000 µm). ISO (International Organization for Standardization) established a standard, ISO20473 that defines the term mid-IR to mean radiation with wavelengths from 3-50 nm. In common literature infrared generally has been divided into near infrared (0.7 to 1.4 microns IRA, IR-A DIN), short wavelength infrared (SWIR or 1.4-3.0 microns IR-B DIN), mid-wavelength (or medium wavelength) infrared at 3-8 microns (MWIR/midIR 3-8 microns IR-C DIN) to long wavelength infrared (LWIR, IR-C DIN) 8-15 microns to far infrared 15-1000 microns.

In this disclosure, throughout the specification, drawings and in the appended claims, MWIR in particular shall have a meaning assigned, and the wavelengths for MWIR shall span from 2-20 microns, and with preferred embodiments in a range of 2.4-8 microns and more preferably in a range of 3-5 microns. Source emissions can include emissions from an MWIR emitter E that is formed from materials with known emissivity functions useful in service of the invention, such as known borosilicate glass.

MWIR Emitter (E)—shall denote any glass or material body that has the requisite optical properties or electromagnetic emissivity properties that allow service to the instant invention as described in the appended claims. This can include glass known under the trade name Pyrex® such as borosilicate glass, which is preferred, or of type Pyrex Glass Code 7740, as well as Pyrex® soda lime glass or other materials. Any material body which serves the invention with useful emissivity as an MWIR emitter when stimulated, excited, or heated shall meet this definition. An IRID emitter and a MWIR emitter can be combined into one body or component.

Minute of total operation—"under one minute of total operation"—"Time under one minute"—shall denote a process of illumination that shall include stepwise, piecemeal, segmented, separated, sequential, variable, or modulated exposures that when totaled, have a summed duration or the equivalent of under one minute, such as four 10-second exposures/flashes over a three minute time, or four ¼ second flashes in one hour.

Near-IR (near infrared)—is defined in varied ways by multiple sources and organizations, such as the International Commission on Illumination (CIE), and as given by ISO standard 20473. In the instant disclosure and appended claims, near-IR shall be assigned to extend from 700 nm to 2 microns (2000 nm) wavelength.

Non-invasive—shall include the attributes of not requiring uprooting, stabbing, cutting, striking or significant mechanical stressing, except for contact with hot bodies or hot fluids such as hot gases or steam when used as a thermal equivalent of general IR (infrared) radiation as taught here.

Non-mutating—shall be construed as relatively non-mutating, such as UV-A radiation being relatively non-mutating when compared to the effect of UV-B radiation.

Plant—shall include any biological organism that succumbs to or is controlled by the instant invention. The can include bacteria, and organisms in the plant and animal kingdoms, and seeds and seedlings.

Powder coat—shall include any and all coverings, coatings, surface treatments, appliques, and depositions to a surface. In this specification, a powder coat MWIR emitter is depicted using the reference character E+.

Rhizosphere—shall include all microorganisms in contact with, in the vicinity of, or interacting with a plant root system, such as nitrogen-fixing bacteria, fungi, and mycorrhizae, such as arbuscular mycorrhizae which can inhabit root structure.

Root—can comprise any number of root types, such as a tap root, a fibrous root, a prop root, an aeria root, an aerating or knee root, a buttress root, or a tuberous root system.

Root crown—shall comprise the portion of a plant root which is above, at, or near the surface established by a soil grade. This shall include the root collar or root neck from which a plant stem arises. Root crown shall also comprise any portion of a seed or seedling which has not affixed itself to a soil grade, but is the root in development or is biological tissue associated with root development.

Seedling, Seed—A seedling shall include any young plant or sporophyte emerging or developing out of a plant embryo or seed, whether before or after germination of any seed. This shall apply to a young plant regardless of stage of development, for any stage of a radicle (embryonic root) of a seed, as well as to any stage for any hypocotyl (embryonic shoot) and any seed leaves, such as with one-leaf monocotyledons and two leaf dicotyledons, or multiple leaf cotyledons, or no cotyledons, such as acotyledons. Any stage of photomorphogenesis shall be included. This definition shall apply even with assistance from natural processes that weaken seed coats to assist with germination, such as heat of a fire, moisture exposure or water immersion, history of passing through an animal's digestive tract, or extreme swings in ambient natural temperature or light levels.

Soil grade—shall include any prevailing soil grade, or any immediately effective soil grade, such as after disturbing of soil.

UV-A radiation—shall denote ultraviolet radiation of wavelength from 300-400 nm.

Vegetative stage or phase—shall denote the growth phase of a plant that occurs after germination and before flowering, during which time the plant has distinct, viable foliage. The term "later stage" associated with "vegetative phase or later" as used in this disclosure and in the appended claims shall include phases more advanced, such as a flowering phase or later stages such as a ripening phase. The instant invention shall be applied as taught and claimed even though a mixture of plants of different phases, including seeds and seedlings, can be under its application. The scope of the amended claims shall not be narrowed by virtue of types or phases of development of plants serving as a target of the instant teachings.

DETAILED DESCRIPTION

Now referring to FIG. 8, a schematic representation of a process is shown according to the invention to eradicate or stress a plant that can be an adult plant, or a seedling, but it is shown illustratively in a vegetative or later phase. The invention employs a dual component illumination protocol that is shown schematically for two portions of the electromagnetic spectrum as shown in FIG. 1 being directed upon parts of an illustrative plant (Dandelion Taraxacum Offinale) resting upon a soil grade. In this protocol, a high speed, substantially non-invasive, low-irradiance method for eradicating a plant in a vegetative or later phase is accomplished in a time under one minute, using dual component indigo region illumination and Medium Wavelength Infrared radiation or illumination about the plant.

Described very briefly and qualitatively, the method comprises:

[1] A foliage and root crown damage illumination component comprising exposure to an an Indigo Region Illumination Distribution (IRID) directed to the foliage and/or the root crown of a plant, with representative IRID rays as shown by dashed arrows in the Figure; and

[2] A ground illumination component, comprising exposure to an Medium Wavelength Infrared (MWIR) radiation directed to the root crown and/or a soil grade immediately adjacent the root crown, with representative MWIR rays as shown by solid arrows in the Figure. Both exposures are of under one minute duration, and preferably under 20 seconds, and most preferably in the range of ½-7 seconds.

Figure 8:
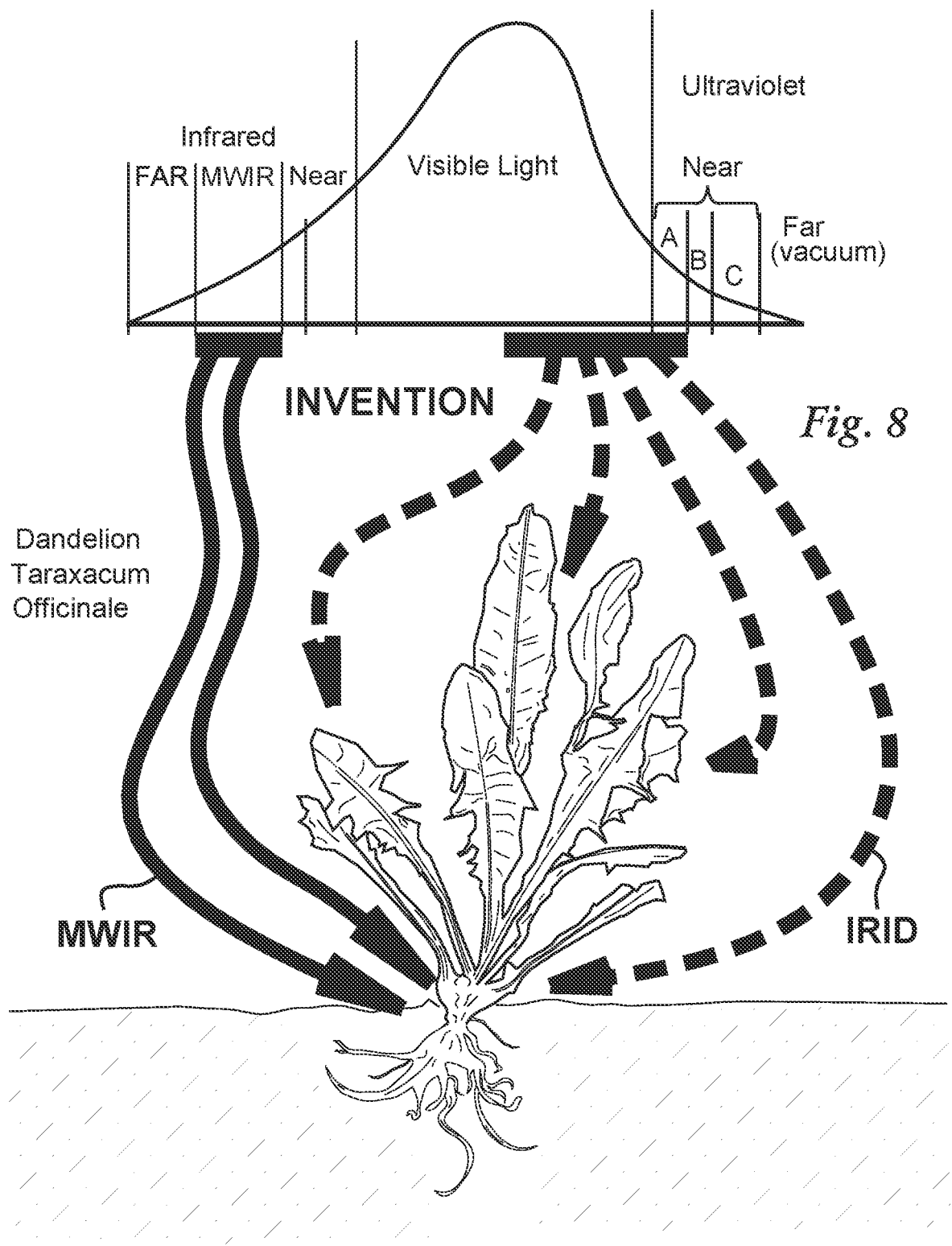
FIG. 8 shows a schematic representation of a process according to the invention to eradicate a plant that is in a vegetative or later phase, using with a dual component illumination protocol shown schematically for two portions of the electromagnetic spectrum as shown in FIG. 1 being directed upon parts of a plant (Dandelion Taraxacum Officinale) resting upon a soil grade.
Figure 9:
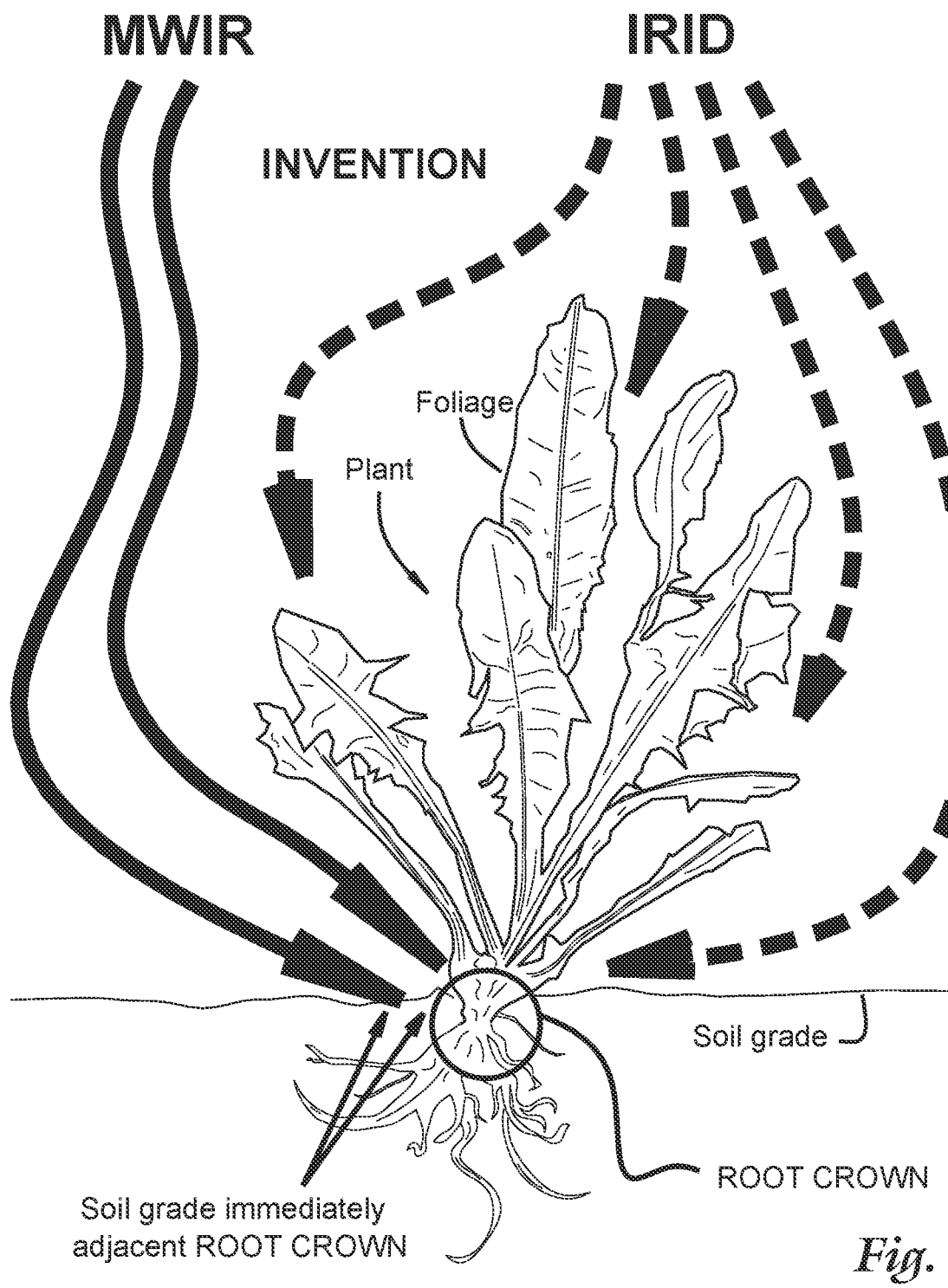
FIG. 9 shows a close-up view of the bottom portion of FIG. 8, showing incident rays for an Indigo Region Illumination Distribution and a Medium Wavelength Infrared illumination distribution aimed and impinging upon the plant in specific ways, and showing plant foliage, the plant root crown and a soil grade immediately adjacent the root crown.

Now referring to FIG. 9, a close-up view of the bottom portion of FIG. 8 is shown. An Indigo Region Illumination Distribution IRID is shown (dashed arrows) directed upon the foliage and/or a root crown of a plant (e.g., Dandelion Taraxacum Offinale) while a Medium Wavelength Infrared radiation MWIR is shown directed to the root crown and/or a soil grade immediately adjacent same (shown). The root crown is shown inside the circled area.

The ground penetrating MWIR illumination component, when directed to a soil grade immediately adjacent the root crown, typically shows a deep penetration of the MWIR rays. This targeted and specifically directed use of Medium Wavelength Infrared MWIR is very important and represents a departure from the prior art. The method discovered helps provide very effective lethality, an unanticipated finding.

It is interesting to note that root-crown temperature has been found to affect plant growth and physiology in various ways. Root crowns need to be exposed for oxygen and gas interchange. Further, a number of pests and diseases affect specifically this part of the plant, including root-crown rot/fungus and various species of root-crown weevil. The root crown area can appear swollen, tapered, constricted or very thin—as well as a combination of these. The root crown is usually located around or at the soil level and can be vaguely or clearly apparent.

Figure 10:
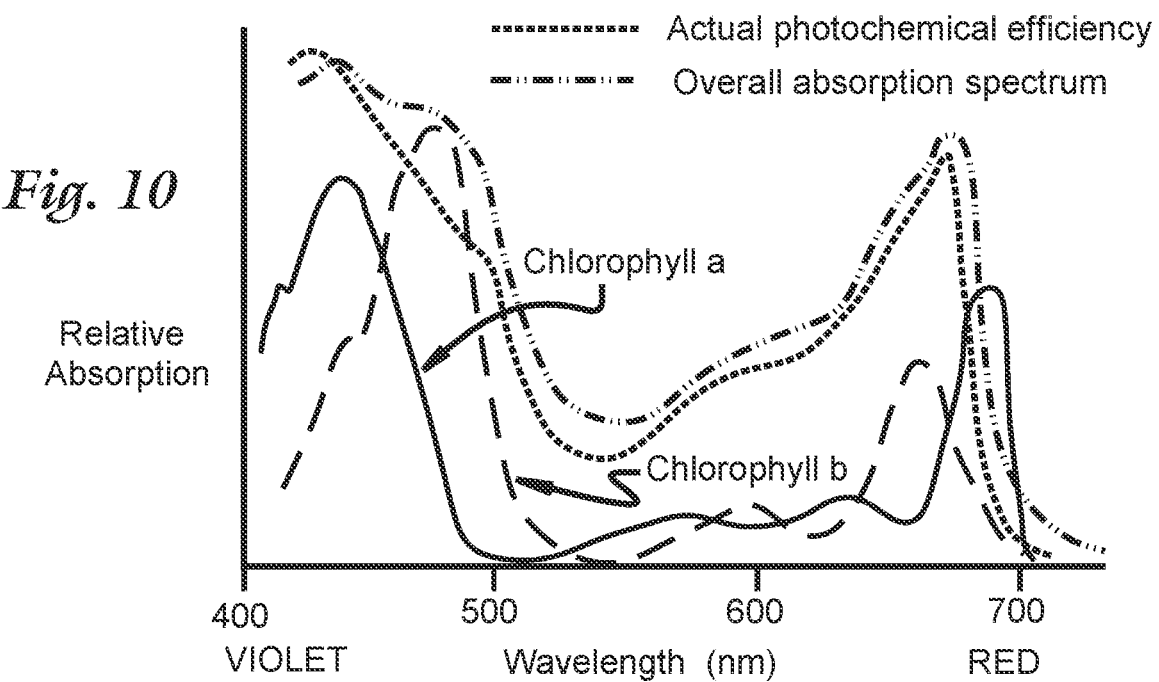
FIG. 10 shows a cartesian plot of relative optical absorption and photochemical efficiency for a plant as a function of wavelength from 400 to 700 nm, and showing absorption for Chlorophyl a and Chlorophyl b.

Now referring to FIG. 10, a cartesian plot of known relative optical absorption and photochemical efficiency for a typical plant is shown as a function of wavelength from 400 to 700 nm. The plot shows relative absorption for Chlorophyl a and Chlorophyl b, and also actual photochemical (photosynthetic conversion) for a typical plant, as well as the overall (optical) absorption spectrum of the plant overall. As can be seen there are two relative peaks centered about blue/violet and red light and this is the regime operation for the bulk of the excitation that fuel photosynthesis and internal regulation in plants, generally.

Figure 11:
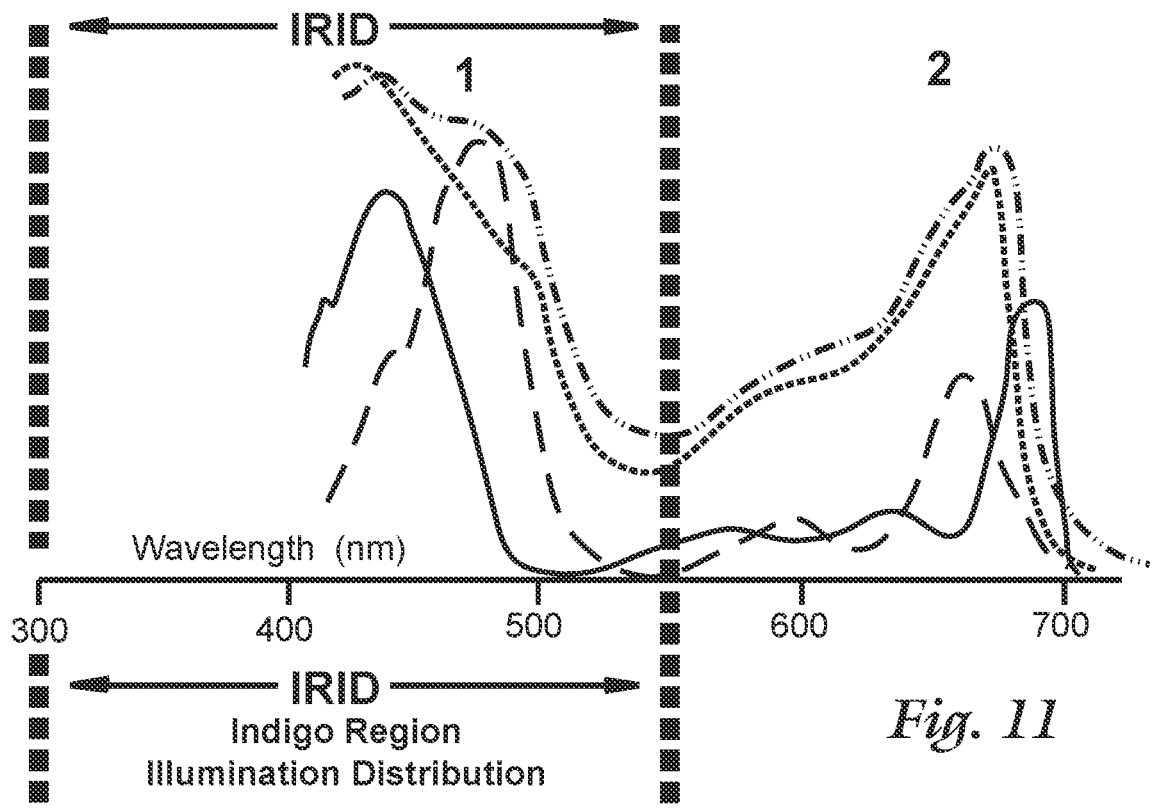
FIG. 11 shows the cartesian plot of FIG. 10, with the span of a Indigo Region Illumination Distribution shown.

Referring now to FIG. 11, the cartesian plot of FIG. 10 is shown, with the span of a Indigo Region Illumination Distribution in service to the instant invention is shown. As can be seen, the Indigo Region Illumination Distribution IRID can extend from 300 nm to a relative low between the two absorption peaks for a typical plant that are due to photochemical action of Chlorophyl a and Chlorophyl b. Specifically, the wavelength regime 1 shown in the Figure to the left of the vertical dotted line depicting 550 nm is that for use as the Indigo Region Illumination Distribution IRID according to the invention. The wavelength regime 2 shown to the right of the 550 nm line that includes yellow, orange and red was found from research and experimentation using controls to be not effective. Addition of this type of light from regime 2 is optional and may serve aesthetic or other purposes, but was discovered to be operationally ineffective for eradication and control. For example, it is notable that known red 650 nm peak LEDs (light emitting diodes) at the same power level as those used to form a Indigo Region Illumination Distribution to meet the protocol of the invention had no measurable effectiveness. However the actual spectral or wavelength distribution of light used to construct a Indigo Region Illumination Distribution IRID can vary.

Figure 12:
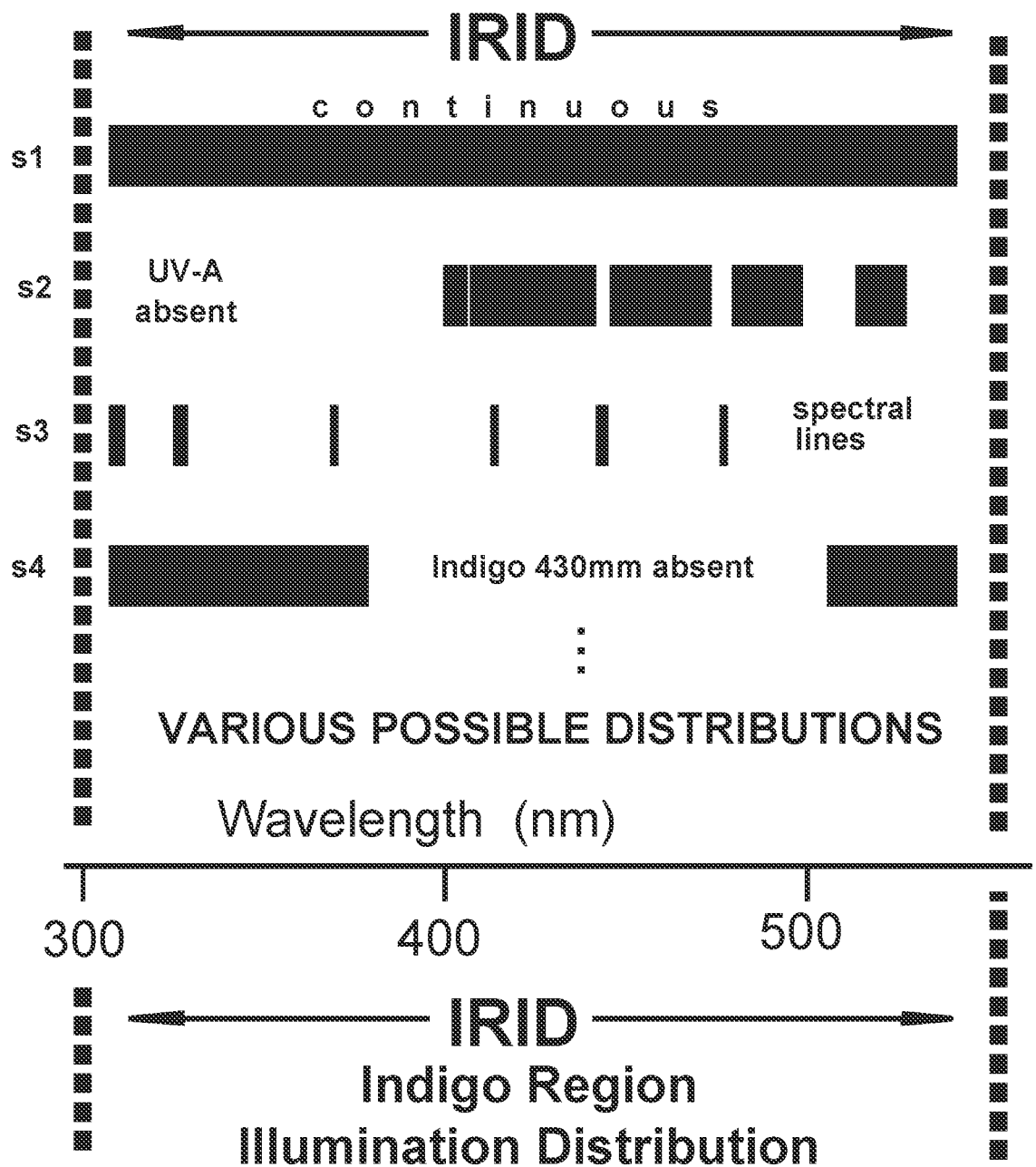
FIG. 12 shows a schematic representation across the range of 300 nm to 550 nm for an Indigo Region Illumination Distribution, with various illustrative possible distribution patterns.

Now referring to FIG. 12, a schematic representation across this range of 300 nm to 550 nm for an Indigo Region Illumination Distribution is shown with various illustrative possible distribution patterns that are possible. This Figure does not show spectral intensity, or spectral irradiance, that is, $W/cm^2$ per unit wavelength—which can vary. The Figure shows only the presence of radiation in particular wavelength, without intensity information.

The first distribution depicted, $s^1$, shows a near full span of the range between 300 and 550 nm, continuous and solid. The second distribution $s^2$ shows another possible distribution from 400 to 550 nn, not continuous and absent UV-A radiation. A third distribution $s^3$ shows various spectral lines of output, with the highest energy radiation at about 480 nm, and consisting of only six emission lines as shown. This can arise from various light sources, such as lasers, and especially ion discharge lamps with no intervening phosphor, etc. A fourth distribution $s^4$ is continuous in part like distribution $s^1$, but is absent mid-wavelengths, and notably is absent wavelengths associated with indigo, for which the Indigo Region Illumination Distribution IRID is named. All these, and other similar distributions are possible in service of the instant invention. However from testing and experimentation, radiation at and around 430 nm appears to be the best for biological effectiveness in eradication and control.

Appearance of the Indigo Region Illumination Distribution IRID to the human eye shall not be indicative of suitability, A Indigo Region Illumination Distribution may not appear "blue" or 'indigo" to the human eye because of the effect of constituent wavelength components—and response of the human eye to light distributions, including known effects of metamerism, shall not limit or narrow the scope of the appended claims, nor narrow the instant teachings.

As stated above, a Indigo Region Illumination Distribution IRID contains wavelengths of light substantially coincident with a short wavelength absorption relative peak (generally of wavelength less than 550 nm) of a plant. Without narrowing the scope of the disclosure or claims, it is believed as a theory that certain processes at this low wavelength peak shown in FIGS. 10 and 11 contribute to the unexpected success of the invention.

Known commercially available high output "blue" LEDs (light emitting diodes) can be used to provide necessary light for Indigo Region Illumination Distribution IRID, providing light generally in a wavelength range from 400 to 550 nm. For example, known SiC (silicon carbide) based LEDs with output from 430-505 nm (appearance blue) are available and have a Forward Voltage of 3.6 volts; GaN (Gallium Nitride) and InGaN (Indium Gallium Nitride) based diodes are also available. Mixture of GaN with In (InGaN) or Al (AlGaN) with a band gap dependent on alloy ratios allows manufacture of light-emitting diodes (LEDs) with varied output peaks. Some LED devices using Aluminium Gallium Nitride (AlGaN) produce ultraviolet (UV-A) light also suitable for a Indigo Region Illumination Distribution, and known phosphors can be used to extend spectral range or to serve another objective such as making a trademark color splash without departing from the scope of the invention and appended claims.

To construct a Indigo Region Illumination Distribution IRID source, commercially available high power UV/violet LED chips are thus available in varied peak distribution wavelengths such as 365 nm, 370 nm, 375 nm, 385 nm, 390 nm 395 nm, 400 nm, 405 nm, and 425 nm with input power ranging from 3 to 100 watts, such as available from Shenzhen Chanzon Technology Co., Ltd., ShenZhen, Guangdong, China. The embodiments shown in Figures which follow employ a 100 watt array, 450 nm peak output. Larger arrays can be built up from constituent chips to serve the requirements of the instant invention for larger scale applications.

Exposures

From experimentation on plants in different life stages, a number of effective operating regimes or exposures for the instant invention were discovered, with treatments as follows:

Method A: A full IRID twin component exposure, directed for eradicating or stressing a plant that is in a vegetative or later phase, is accomplished by [A1] exposing any of a foliage of the plant and a root crown of the plant to an Indigo Region Illumination Distribution (IRID) of an average irradiance $E_{IRID}$ between 0.125 W/cm$^2$ and 2 W/cm$^2$ during at least a portion of the treatment time, to provide a foliage and root crown illumination A1 exposure; and [A2] exposing any of a root crown of the plant and a soil grade immediately adjacent the root crown to infrared radiation that is substantially Medium Wavelength Infrared (MWIR) radiation of an average irradiance $E_{MWIR}$ between 0.045 W/cm$^2$ and 0.72 W/cm$^2$ during at least a portion of the treatment time, to provide a root crown and soil grade illumination A2 exposure; the exposures A1 and A2 for respective times that together allow signaling, but not sufficient together to cause substantial high temperature thermally-induced leaf and plant component failure during the exposures.

Method B: A low IRID summed twin component exposure, with compensating MWIR, directed for eradicating or stressing a plant that is in a vegetative or later phase, is accomplished by [B1] exposing any of a foliage of the plant and a root crown of the plant to an Indigo Region Illumination Distribution (IRID) of an average irradiance $E_{IRID}$ between 0.05 W/cm$^2$ and 0.125 W/cm$^2$ during at least a portion of the treatment time, to provide a foliage and root crown illumination B1 exposure; and [B2] exposing any of a root crown of the plant and a soil grade immediately adjacent the root crown to infrared radiation that is substantially Medium Wavelength Infrared (MWIR) radiation of an average irradiance $E_{MWIR}$ such that the sum of the Indigo Region Illumination Distribution average irradiance $E_{IRID}$ and the Medium Wavelength Infrared (MWIR) radiation of an average irradiance $E_{MWIR}$ is at least 0.25 W/cm$^2$ and less than 7 W/cm$^2$, that is $$0.25\ W/cm^2 \leq E_{IRID} + E_{MWIR} < 7\ W/cm^2$$

during at least a portion of the treatment time, to provide a root crown and soil grade illumination B2 exposure; the exposures B1 and B2 for respective times that together allow signaling, but not sufficient together to cause substantial high temperature thermally-induced leaf and plant component failure during the exposures.

Method C: A saturation twin component exposure, directed for eradicating or stressing a plant that is in a vegetative or later phase, is accomplished by [C1] exposing any of a foliage of the plant and a root crown of the plant to an Indigo Region Illumination Distribution (IRID) of an average irradiance $E_{IRID}$ of at least 0.125 W/cm$^2$ during at least a portion of the treatment time, to provide a foliage and root crown illumination C1 exposure; and [C2] exposing any of a root crown of the plant and a soil grade immediately adjacent the root crown to infrared radiation that is substantially Medium Wavelength Infrared (MWIR) radiation of an average irradiance $E_{MWIR}$ such that the sum of the Indigo Region Illumination Distribution average irradiance $E_{IRID}$ from step [C1] and the Medium Wavelength Infrared (MWIR) radiation of an average irradiance $E_{MWIR}$ is at least 0.125 W/cm$^2$ and less than 7 W/cm$^2$, that is $$0.125\ W/cm^2 \leq E_{IRID} + E_{MWIR} < 7\ W/cm^2$$

during at least a portion of the treatment time, to provide a root crown and soil grade illumination C2 exposure; the exposures C1 and C2 for respective times that together allow signaling, but not sufficient together to cause substantial high temperature thermally-induced leaf and plant component failure during the exposures.

Method D: A twin component exposure, directed to eradicate or stress a plant that is in the seedling phase or stage, is accomplished by [D1] exposing any of a foliage of the plant and a root crown of the plant to an Indigo Region Illumination Distribution (IRID) of an average irradiance $E_{IRID}$ between 0.1 W/cm$^2$ and 1 W/cm$^2$ during at least a portion of the treatment time, to provide a foliage and root crown illumination D1 exposure; and [D2] exposing any of a root crown of the plant and a soil grade immediately adjacent the root crown to infrared radiation that is substantially Medium Wavelength Infrared (MWIR) radiation of an average irradiance $E_{MWIR}$ between 0.035 W/cm$^2$ and 0.35 W/cm$^2$ during at least a portion of the treatment time, to provide a root crown and soil grade illumination D2 exposure; the exposures D1 and D2 for respective times that together allow signaling, but not sufficient together to cause substantial high temperature thermally-induced leaf and plant component failure during the exposures.

Medium Wavelength Infrared MWIR wavelengths can be in a distribution, with similar variability as that of the Indigo Region Illumination Distribution IRID as discussed above for FIG. 12. Medium Wavelength Infrared according to the invention can range from infrared wavelengths of 2-20 microns (2000-20,000 nm); a preferred range is 2.4-8 microns (2400 nm-8000 nm) and more preferred is the vicinity of 3-5 microns (3000-5000 nm).

The method of the invention allows for many different possible lighting and beam forming configurations. Beam forming and reflector-endowed lamp sets can be devised to allow both [1] the above-ground foliage and root crown damage illumination component that directs Indigo Region Illumination Distribution IRID to the foliage and/or the root crown of a plant, and [2] the ground-penetrating Medium Wavelength Infrared MWIR component that directs Medium Wavelength Infrared radiation directed to the root crown and/or a soil grade immediately adjacent the root crown—to happen or operate simultaneously, if desired, and also if desired, originate within the same general lamp or photoemissive device or lamp housing.

Figure 13:
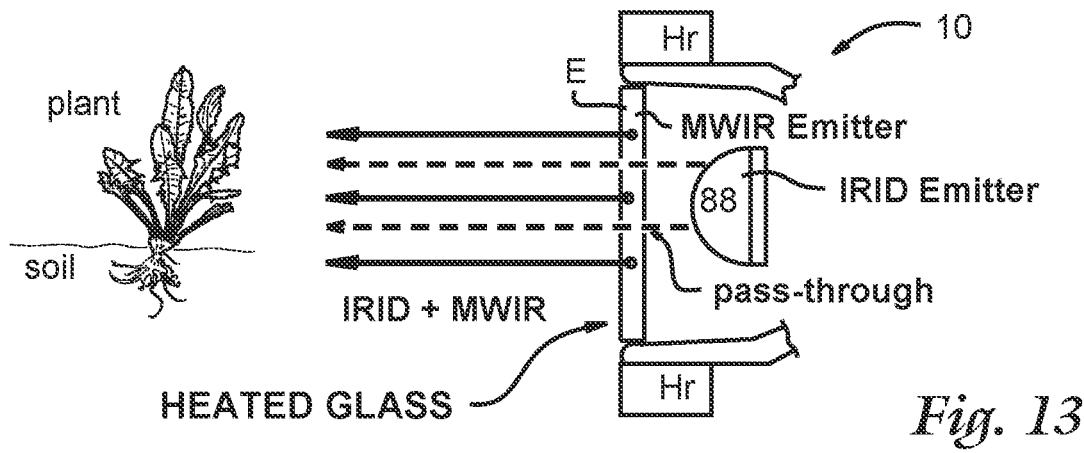
FIGS. 13 and 14 show schematic cross-sectional representations of a proximity pass-through configuration illuminator according to the invention.
Figure 14:
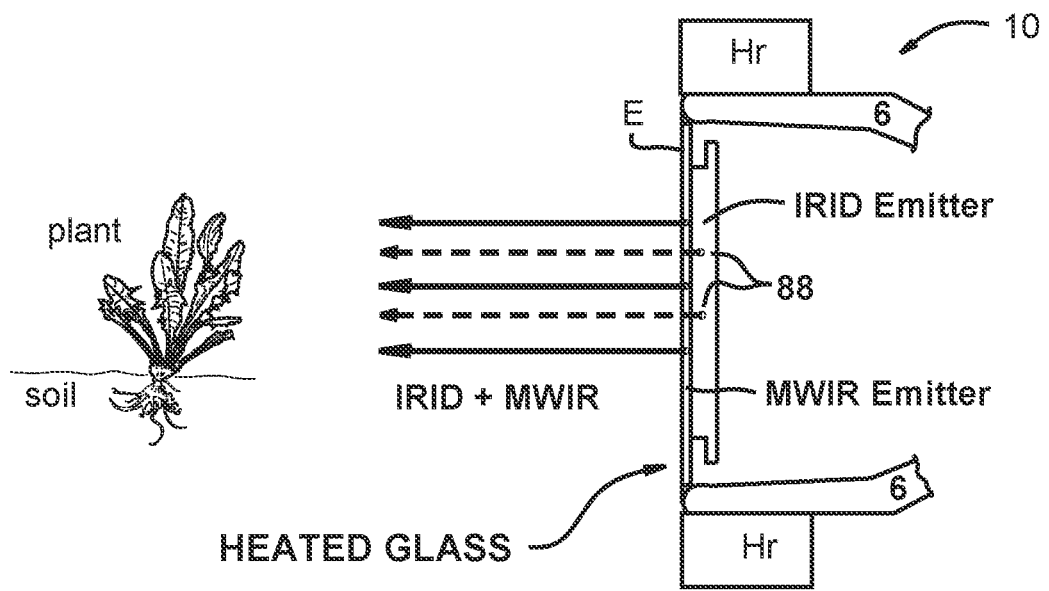

Now referring to FIGS. 13-19, various pass-through, shrouded lamp and reflector configurations that may be used to practice some embodiments of the instant invention are shown. In FIGS. 13 and 14, simple schematic cross-sectional representations of an advantageous, compact proximity pass-through configuration illuminator 10 (PROXIMITY PASS-THROUGH CONFIGURATION ILLUMINATOR) according to the invention are shown. Inside a housing 6, are a IRID emitter 88 and a MWIR emitter E. As can be seen, the IRID emitter and the MWIR emitter are sized, positioned and oriented to allow light output from each of said IRID emitter and MWIR emitter to be substantially superposed for directing to said plant, with rays of type shown in FIGS. 8 and 9 being directed to a plant to the left on the Figure. Light generated as shown emerging from IRID emitter 88 passes through the physical MWIR emitter E. MWIR emitter E can comprise glass in various forms, such as plate glass, and be can selected from borosilicate glass, e.g., Pyrex® Glass Code 7740, soda lime glass, and other material, such as that having high thermal emissivity in the range of Medium Wavelength Infrared wavelengths as defined herein. This can include materials having coatings or surface treatments that have favorable MWIR emission characteristics.

MWIR emitter E is heated using a heater (shown in later Figures), assisted by a heating ring Hr as shown, in thermal communication with illustrative glass (e.g., borosilicate glass) of MWIR emitter E. Borosilicate glass and other similar materials conduct heat across themselves, and this heated glass allows efficient coupling into MWIR wavelengths and allows a pass-through of Indigo Region Illumination Distribution IRID light as shown.

Figure 15:
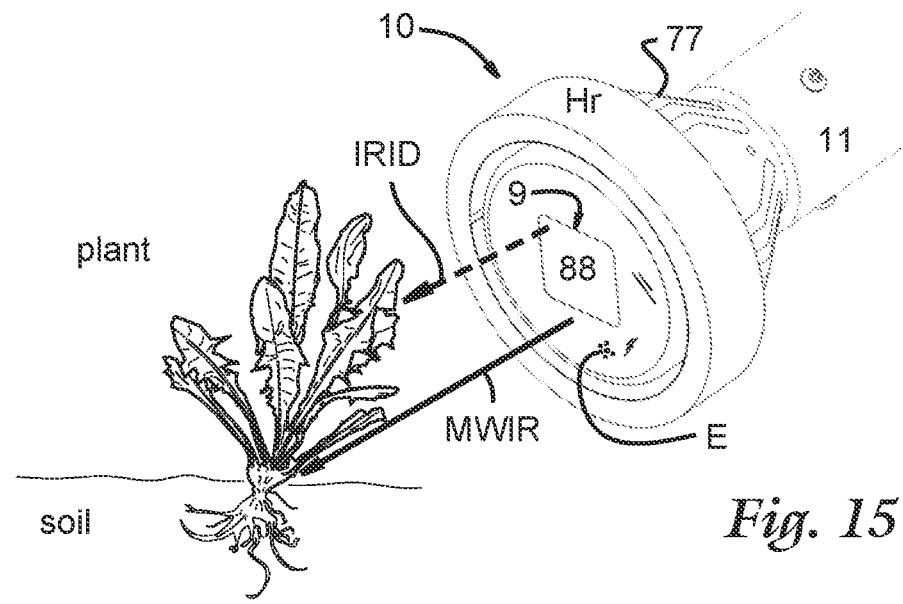
FIG. 15 shows an oblique surface view of a proximity pass-through configuration illuminator according to the invention.

Now referring to FIG. 15, an oblique surface view of a proximity pass-through configuration illuminator 10 of FIGS. 13 and 14 according to the invention is shown. As shown, mounting pipe 11 supports the illuminator 10, with IRID emitter 88 located behind transparent glass MWIR emitter E in the Figure, which can be an LED array. Indigo Region Illumination Distribution IRID radiation from IRID emitter 88 passes through MWIR emitter E and joins MWIR rays for directing to a plant, as shown. MWIR emitter E is heated with assistance from heat ring Hr, and a heat sink 77 is sized, positioned, and oriented to be in thermal communication with IRID emitter 88 to cool the IRID emitter. Not shown in this Figure is a thermal insulator Y and thermal reflector Z that thermally separate MWIR emitter E from IRID emitter 88, but an aperture 9 in those thermal barriers is shown, to allow the Indigo Region Illumination Distribution IRID to pass through the glass of MWIR emitter E.

Indigo Region Illumination Distribution IRID and Medium Wavelength Infrared MWIR can thus be directed at a plant. Aiming can be of the spillover type of exposure. Spillover can naturally occur to many areas as can be expected when illuminating plant of different sizes, stem stiffness, and foliage arrays, with differing orientations. This spillover will not affect aiming of an operatively effective portion of the light is as directed by the instant teachings and appended claims. In practicing the invention, a small gap is preferred between the MWIR emitter E and the plant root or base because of attenuation and r-squared losses, and those of ordinary skill in the art will be able to position, size, and move the illuminator appropriately.

Figure 16:
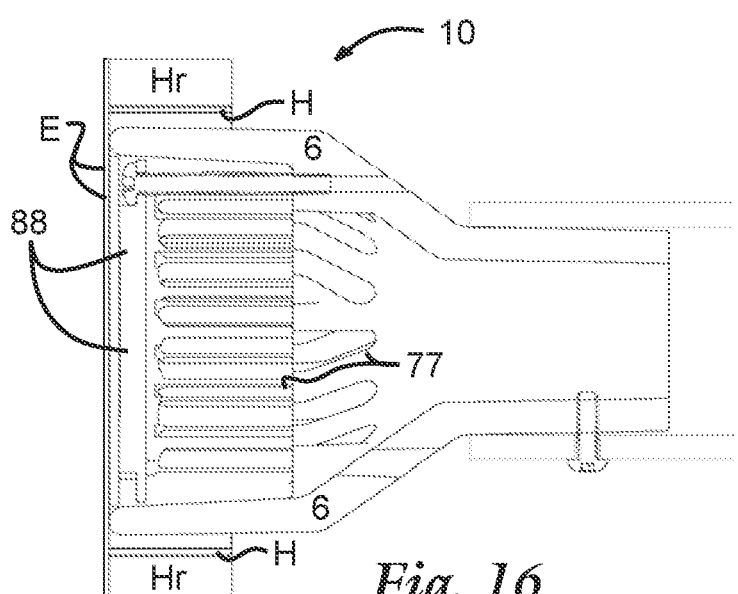
FIG. 16 shows a split cross-sectional view of a proximity pass-through configuration illuminator according to the invention, with distinct upper and lower plane views.

FIG. 16 shows a split cross-sectional view of a proximity pass-through configuration illuminator according to the invention, with distinct upper and lower plane views. LED array IRID emitter 88 is shown inboard of MWIR emitter E, which is in contact with, or thermal communication with a known 100 watt Kapton heater H, assisted by heat ring Hr affixed to housing 6. Heat sink 77 in thermal communication with LED array IRID emitter 88 for cooling same. MWIR emitter E can be heated to a temperature of 400 F to 1000 F for efficacity and safety when in service of the instant invention. Guards (not shown) can be added.

Figure 17:
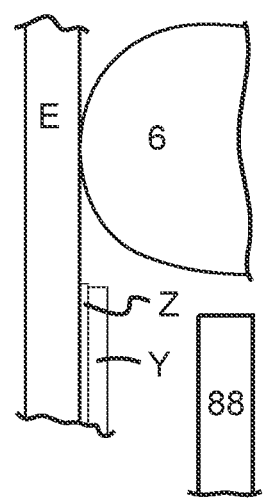
FIG. 17 shows a cross-sectional close-up partial schematic view of elements of the proximity pass-through configuration illuminator shown in FIGS. 13-16, with thermal reflector and insulators to protect a light source for the Indigo Region Illumination Distribution illumination.

FIG. 17 shows a cross-sectional close-up partial schematic view of elements of the proximity pass-through configuration illuminator shown in FIGS. 13-16. Thermal protection can be arranged to protect LED array IRID emitter 88 from heat generated from MWIR emitter E, which can optionally comprise on its inboard surface a thermal reflector Z, which in turn can have at its inboard surface a thermal insulator Y. An aperture 9, previously shown in FIG. 15, can be sized, and positioned to allow LED array IRID emitter 88 to emit the desired Indigo Region Illumination Distribution IRID through MWIR emitter E. Thermal reflector Z can be fabricated from known aluminum foil 1 mil thick. Thermal insulator Y can be 0.005 inch (5 mil, 0.2 mm) thick film made from known polycarbonate, or PFA (Perfluoroalkoxy alkane). Commercially available LED arrays can have lifetimes of 50,000 hours if the working temperature history is kept under 60 C.

Now referring to FIG. 18, an oblique view of a proximity pass-through configuration illuminator of FIG. 15 according to the invention, with a ¼ cylindrical cut-out showing cross-sections (PROXIMITY PASS-THROUGH CONFIGURATION). LED array IRID emitter 88 illustratively comprises as shown a 100 watt Chanzon® 1DGL-JC-100 W-440 Royal Blue chip-on-board (COB) surface mounted device (SMD), with peak emission at 440-450 nm, drawing 3000 mA at 30-34 volts DC. Individual LED cells in LED array IRID emitter 88 and an array mount m can be seen behind glass MWIR emitter E, which is not explicitly visible except for line hatching in the Figure adjacent the reference character indicator lines for E and the MWIR ray. Kapton heater H is in thermal communication with heat ring Hr and MWIR emitter E. Very close approach to plants can be achieved with this proximity pass-through configuration, and MWIR emitter E can be kept at 400 F to 1000 F with appropriate guards known in the art to prevent ignition of biomass and materials. Additional known optics can be added, such as outer reflectors whose shape comprises compound parabolic curves, or other advantageous light handling to suit a particular application.

A baseline ("midlevel") exposure that typifies operation for many applications is average irradiances (see Definitions section) of 0.5 W/cm$^2$ of Indigo Region Illumination Distribution IRID radiation and 0.18 W/cm$^2$ of Medium Wavelength Infrared MWIR radiation. The average power levels are important and must be delivered in seconds, not minutes, hours, or days for efficacy, according to the discoveries made. Lethality is pronounced, with many yields at 100% with no regrowth after two weeks. With this baseline exposure, for a first test, on 1 inch tall rye grass, less than 4 months since germination, lethality of 100% was obtained with a 2 second exposure. For a second test, on 8 inch tall cereal rye grass, 6 months since germination, lethality of 85% was obtained with a 5 second exposure. For a third test, dandelion (Dandelion Taraxacum Offinale) with less than a 6 inch rosette at the root crown, and greater than 1 year but less than two since germination, 83% lethality was obtained with a 10 second exposure. For a fourth test, dandelion less than 4 inches in rosette diameter, and 6 months since germination, 100% lethality was obtained with a 5 second exposure. With a fifth test, dandelion with rosettes more than 6 inches in diameter and more than 2 years since germination, 75% lethality was obtained with a 15 second exposure.

MWIR emitter E can be heated with varying temperatures from a minimum of 250 F, to 400 F to past the Draper Point (977 F) to 1000 F. According to the Stefan-Boltzmann law, a black body at the Draper point emits 23 kilowatts/m$^2$ radiation, nearly all infrared. The embodiments disclosed herein allow for substantially superposed Indigo Region Illumination Distribution IRID and Medium Wavelength Infrared MWIR radiation for illumination at a target plant, and are especially advantageous for this purpose. However, as will be mentioned below, both component radiations can arise from different sources not in a unitary housing or device.

The use of the instant invention can be particularly helpful in agriculture. Referring now to FIG. 19, the proximity pass-through configuration illuminator of FIG. 18 is shown, with Indigo Region Illumination Distribution and Medium Wavelength Infrared rays trained upon a seedling, shown as Amaranthus Tuberculatus, and known commonly as waterhemp, a plant of concern to farmers.

Seedlings are fast developing organisms with special characteristics and the teachings of the instant invention apply differently to achieve efficacity. There are different structural developing components in various seedlings as they develop a root system and differentiate physically. In this sense the root crown shall include the root collar or root neck from which a plant stem arises. The root crown shall also comprise any portion of a seed or seedling which has not affixed itself to a soil grade, but is the root in development or is biological tissue associated with root development.

Monocotyledons (one-seed leaves) and dicotlydons (two-seed leaves) differ in early seedling development. In monocotyledons, a primary root is protected by a coating, a coleorhiza, which ejects itself to yield to allow seedling leaves to appear, which are in turn protected by another coating, a coleoptile. With dicotyledons a primary root radicle grows, anchoring the seedling to the ground, and further growth of leaves occurs.

Amaranthus Tuberculatus or waterhemp, has gone herbicide resistant and creating a economic and productivity problems for farmers in the United States. Waterhemp seedlings are known to grow as much as 1- to 1¼-inches per day, while another weed that is a threat to agriculture, Palmer amaranth, has been known to grow 1½- to 2-inches per day. Farmers need to spend capital to control weeds like Palmer amaranth and waterhemp. As a result, in North America, tall waterhemp is considered a major weed of agricultural fields and other disturbed habitats. Because of a long germination window, single herbicide applications are not considered effective. Tall waterhemp have been reported resistant to acetolactate synthase inhibiting (ALS) herbicides and the triazines, and resistance to acifluorfen and other diphenyl ether herbicides has been reported.

Figure 6:
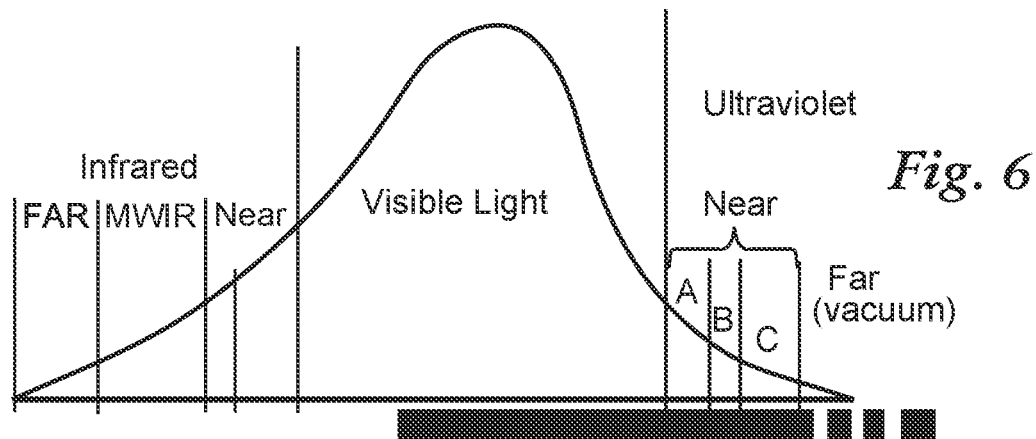
FIGS. 6 and 7 show together one typical class of prior art eradication processes or occurrences whereby extreme ultraviolet light induced trauma is delivered with a large energy UV radiative transfer via general illumination or flash onto a naturally grown species Digitaria sanguinalis rooted into a soil grade.
Figure 7:
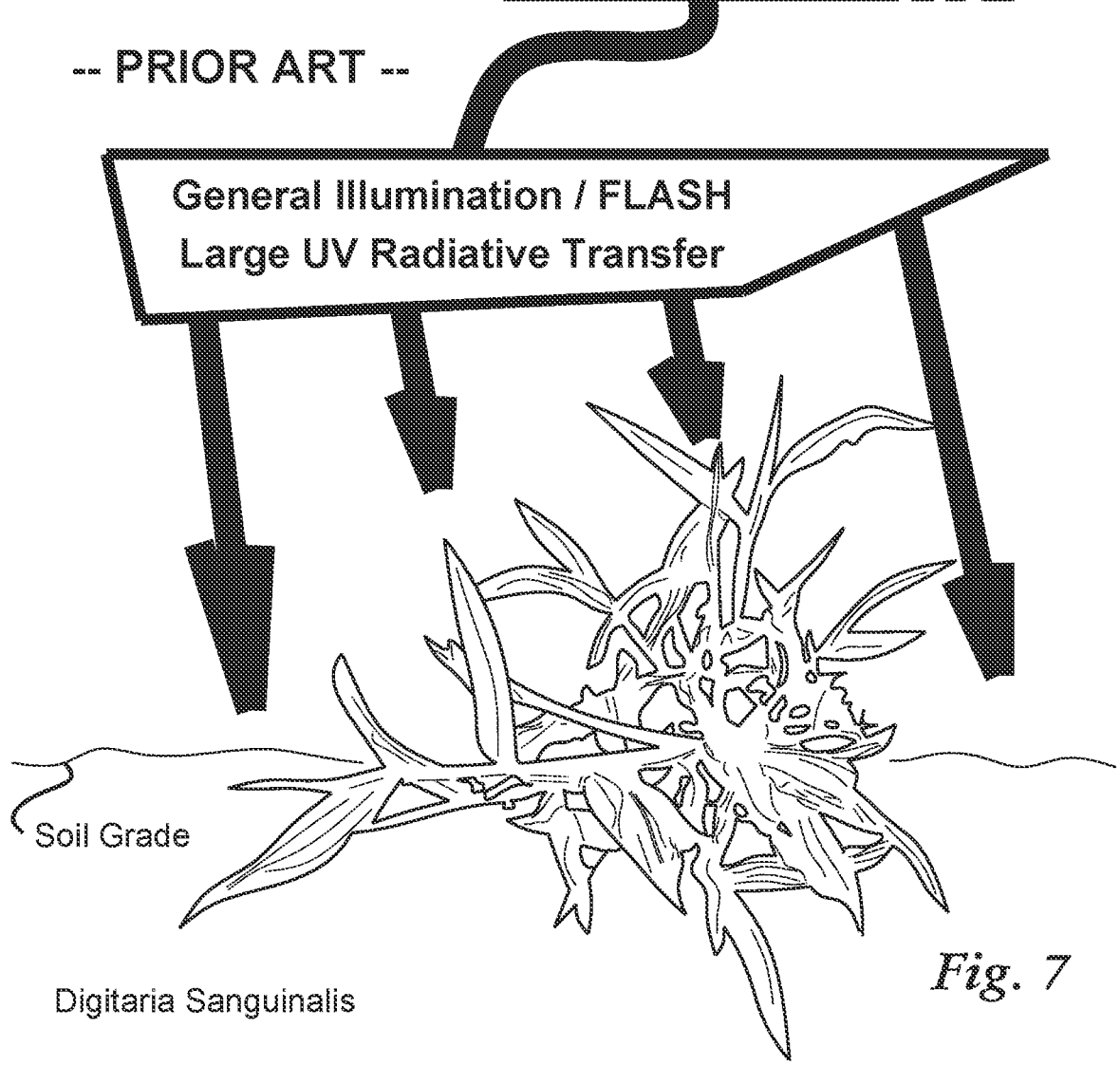
Figure 20:
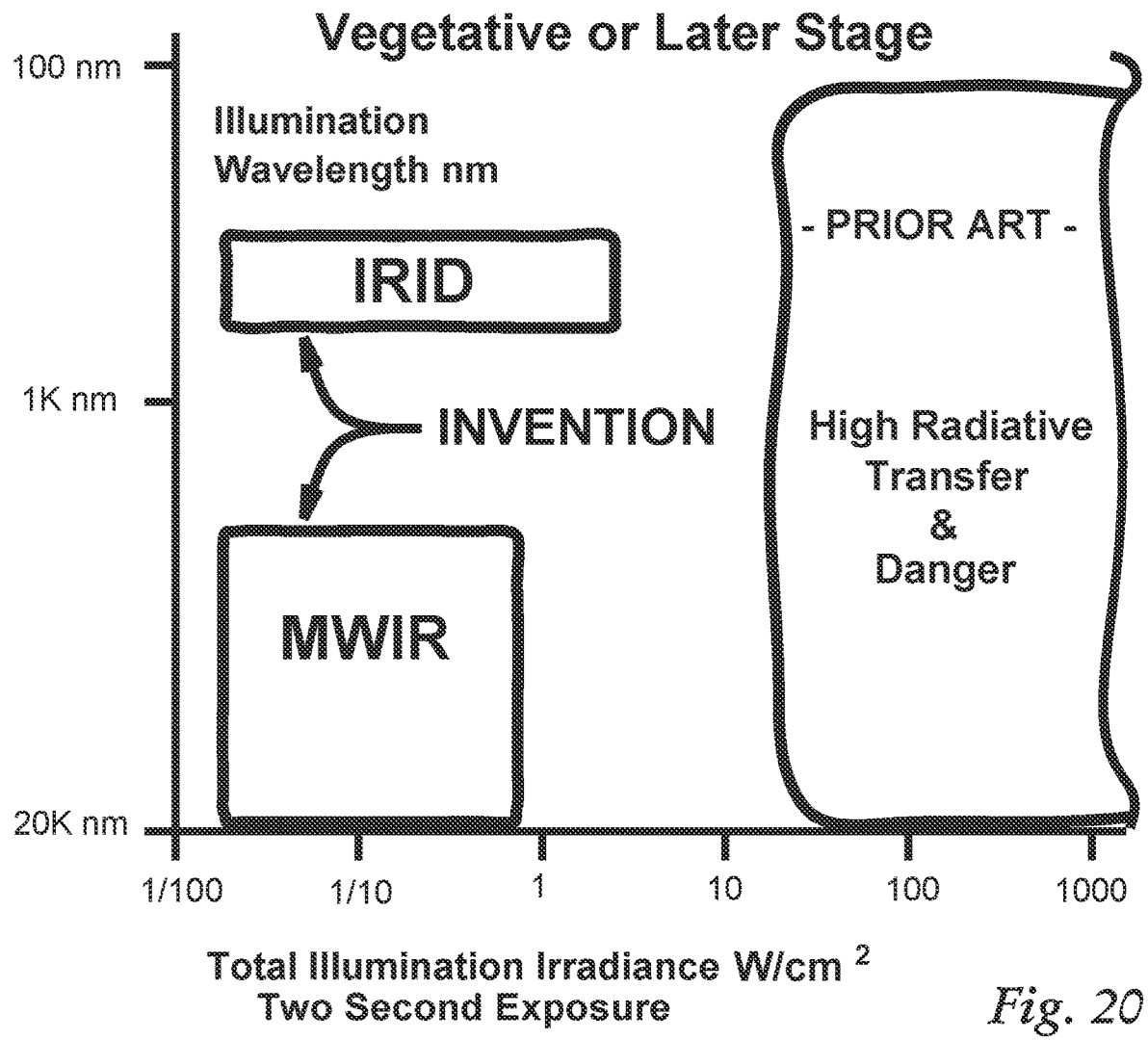
FIG. 20 shows a logarithmic cartesian plot representation of Illumination Wavelength versus Total Illumination Irradiance indicated by closed figure for a typical illustrative approximate regime of operation for the instant invention applied to plants in a vegetative stage or later, using an Indigo Region Illumination Distribution and a Medium Wavelength Infrared illumination distribution, with contrast shown to the prior art high radiative transfer depicted in FIGS. 6 and 7, shown on this plot in closed figure.

Now referring to FIG. 20 shown is a logarithmic cartesian plot representation of Illumination Wavelength versus Total Illumination Irradiance indicated by closed figure for a typical illustrative approximate regime of operation for the instant invention applied to plants in a vegetative stage or later, using an Indigo Region Illumination Distribution and a Medium Wavelength Infrared illumination distribution—with contrast shown to the dangerous prior art high radiative transfer depicted in FIGS. 6 and 7, shown on this plot in closed figure. As shown, the instant invention is in a different regime. Average irradiances for Indigo Region Illumination Distribution IRID radiation and Medium Wavelength Infrared MWIR radiation are on the order of single digit or fractional W/cm$^2$, while the high radiative transfer of the prior art is higher by 1-5 orders of magnitude (factors of ten), such as radiative transfer of 50 W/cm$^2$.

Now referring to FIG. 21, a listing of operative attributes is shown for a class of prior art large radiative and large UV radiative transfers as depicted in FIGS. 6, 7, and 8. Specifically, the use of energy distributions such as those high in UV-B and UV-C radiation—have effects on plant life, such as scalding, burning, an ultraviolet burn similar to extreme sun burn in humans called UV burn, leaf and plant component failure, and dehydration. Ironically, it is evident that the more destructive the radiative transfer, the more plants appear to be equipped to regrow, likely so because of evolution dealing with fire, flood, windstorms, trampling by animals, disease, pestilence, drought, landslides, etc.

Figure 22:
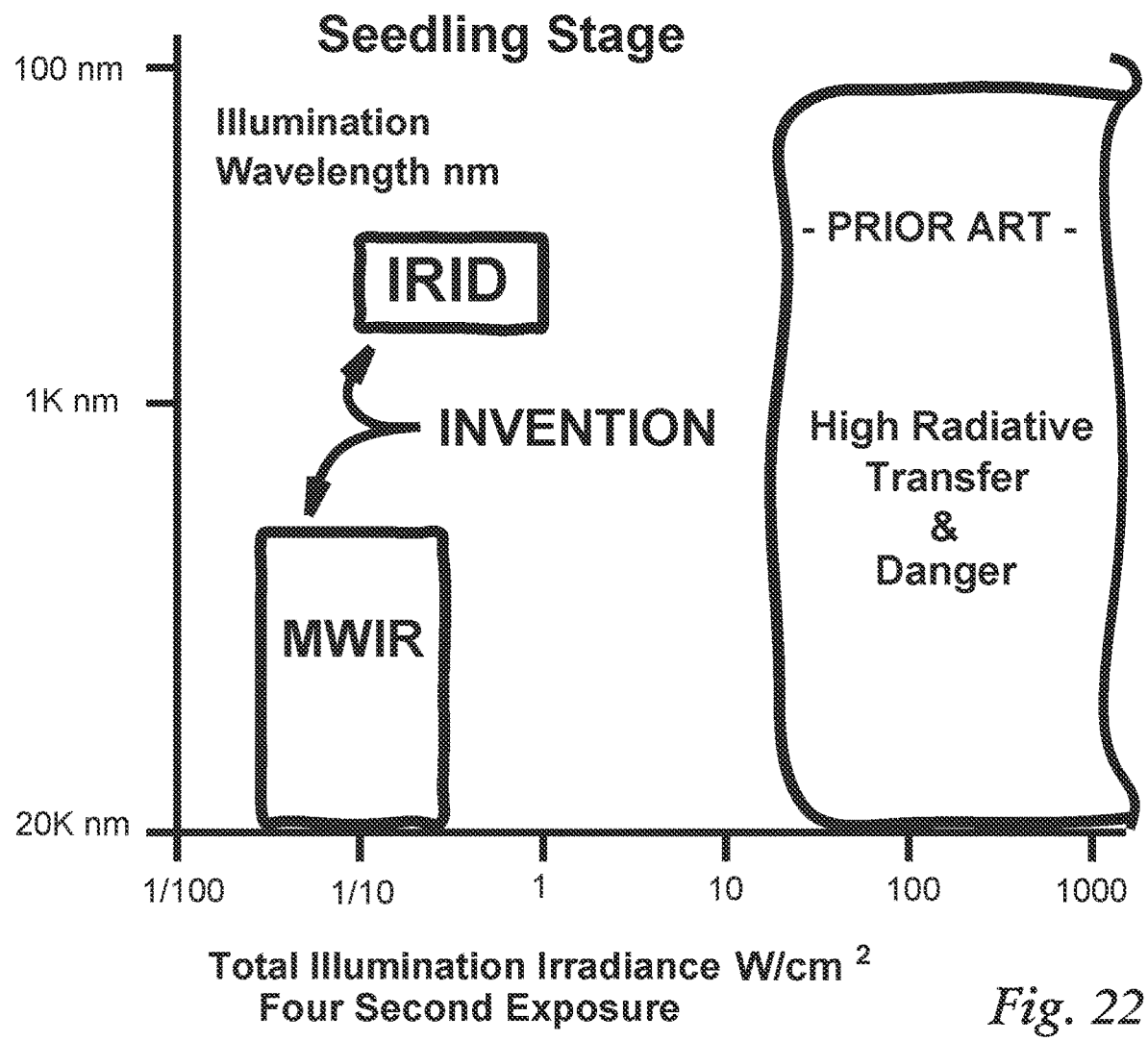
FIG. 22 shows a logarithmic cartesian plot representation similar to that of FIG. 20, of Illumination Wavelength versus Total Illumination Irradiance indicated by closed figure for a typical illustrative approximate regime of operation for the instant invention applied to seedlings, using an Indigo Region Illumination Distribution and a Medium Wavelength Infrared illumination distribution, with contrast again shown to the prior art high radiative transfer depicted in FIGS. 6 and 7, shown on this plot in closed figure.

Now referring to FIG. 22, a logarithmic cartesian plot representation similar to that of FIG. 20 is shown, depicting Illumination Wavelength versus Total Illumination Irradiance indicated by closed figure for a typical illustrative approximate regime of operation for the instant invention applied to seedlings, using an Indigo Region Illumination Distribution and a Medium Wavelength Infrared illumination distribution, with contrast again shown to the prior art high radiative transfer depicted in FIGS. 6 and 7, shown on this plot in closed figure. Again, as shown, the instant invention applied to seedlings is in a different regime. Average irradiances for Indigo Region Illumination Distribution IRID radiation and Medium Wavelength Infrared MWIR radiation for seeds and seedlings are again on the order of single digit or fractional W/cm$^2$, while the high radiative transfer of the prior art is higher by orders of magnitude. Use of the invention does not lead to ignition of biomass or burning of plant components.

Figure 23:
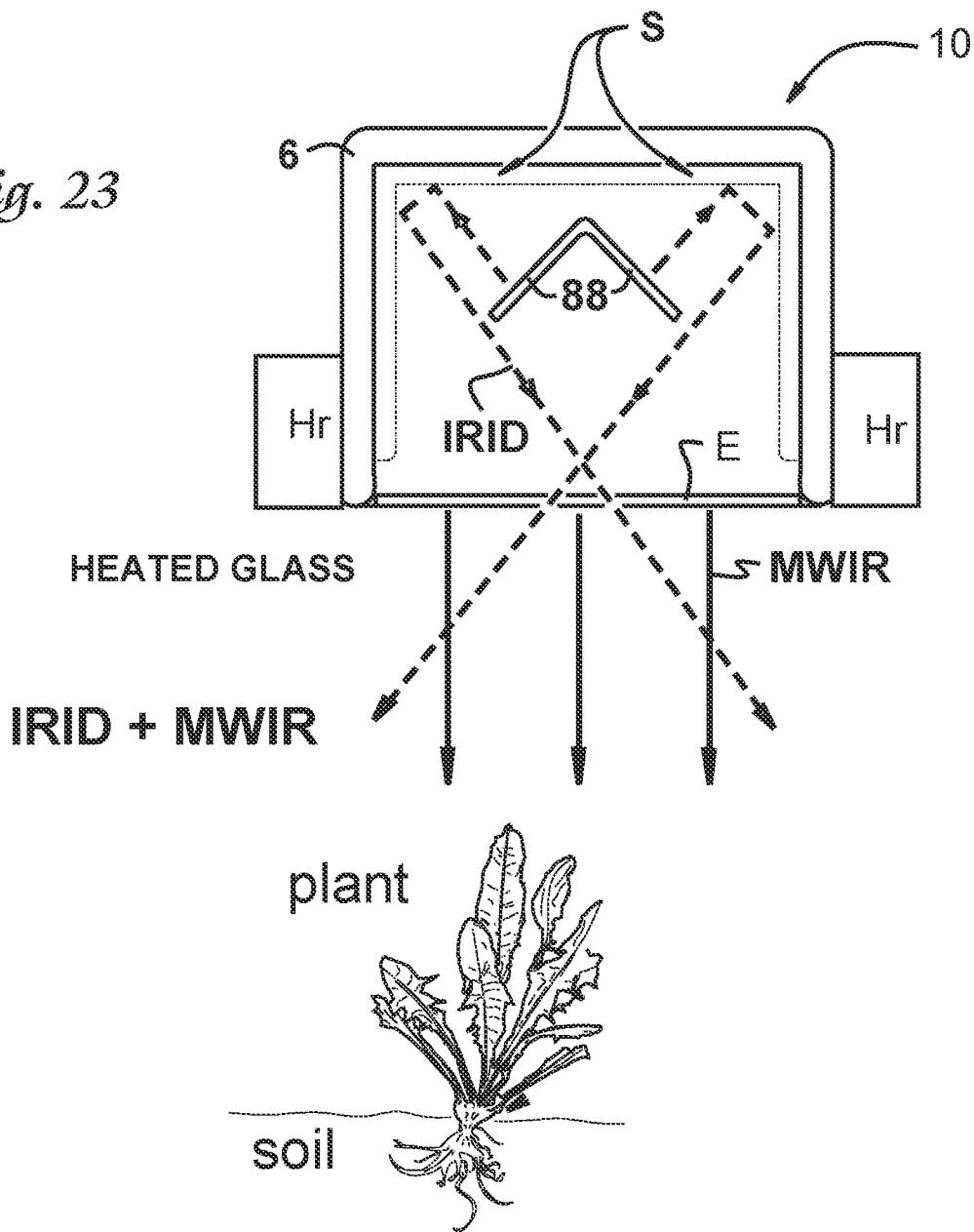
FIG. 23 shows a cross-sectional schematic view of a proximity pass-through configuration illuminator according to the invention, with a shrouded Indigo Region Illumination Distribution (IRID) emitter.

Now referring to FIG. 23, a cross-sectional schematic view is shown of another type of illustrative preferred proximity pass-through configuration illuminator according to the invention, with a shrouded Indigo Region Illumination Distribution IRID emitter 88 preferably comprising a LED array, which is sized, positioned, and oriented to allow light output therefrom to reflect off a surface before emerging from the illuminator. That surface S has been chosen illustratively to be Spectralon®, a durable fluoropolymer available from Labsphere® of North Sutton NH, USA. Housing 6 can comprise inner cup surface S as shown, and LED array IRID emitter 88 direct light output upward in the figure into this cup or surface. Rays (dotted) as shown or Indigo Region Illumination Distribution IRID reflect from this surface S and emerge directly through MWIR emitter E as before, with the MWIR emitter E employing heated glass (borosilicate glass preferred) assisted by action of Kapton heater H (not shown) and heat ring Hr. In this embodiment reduced heating of the MWIR emitter E can be needed because the Indigo Region Illumination Distribution IRID pass-through can assist with heating of the glass, and tinting or other treatment of MWIR emitter E can enhance this effect.

Surface S optional Spectralon® material has a hardness roughly equal to that of high-density polyethylene and is thermally stable to 350 C or 662 F. It exhibits absorption at 2800 nm, then absorbs strongly (less than 20% reflectance) from 5400 to 8000 nm, thus giving it a corresponding high emissivity in the range of 5400 nm to 8000 nm (5.4-8.0 microns), putting its emissivity in range for MWIR emitter E according to the invention. Borosilicate glass or other MWIR emitter E is optional as can be seen in the discussion for FIG. 24 where a fluoropolymer like Spectralon® can act as an MWIR emitter.

Figure 24:
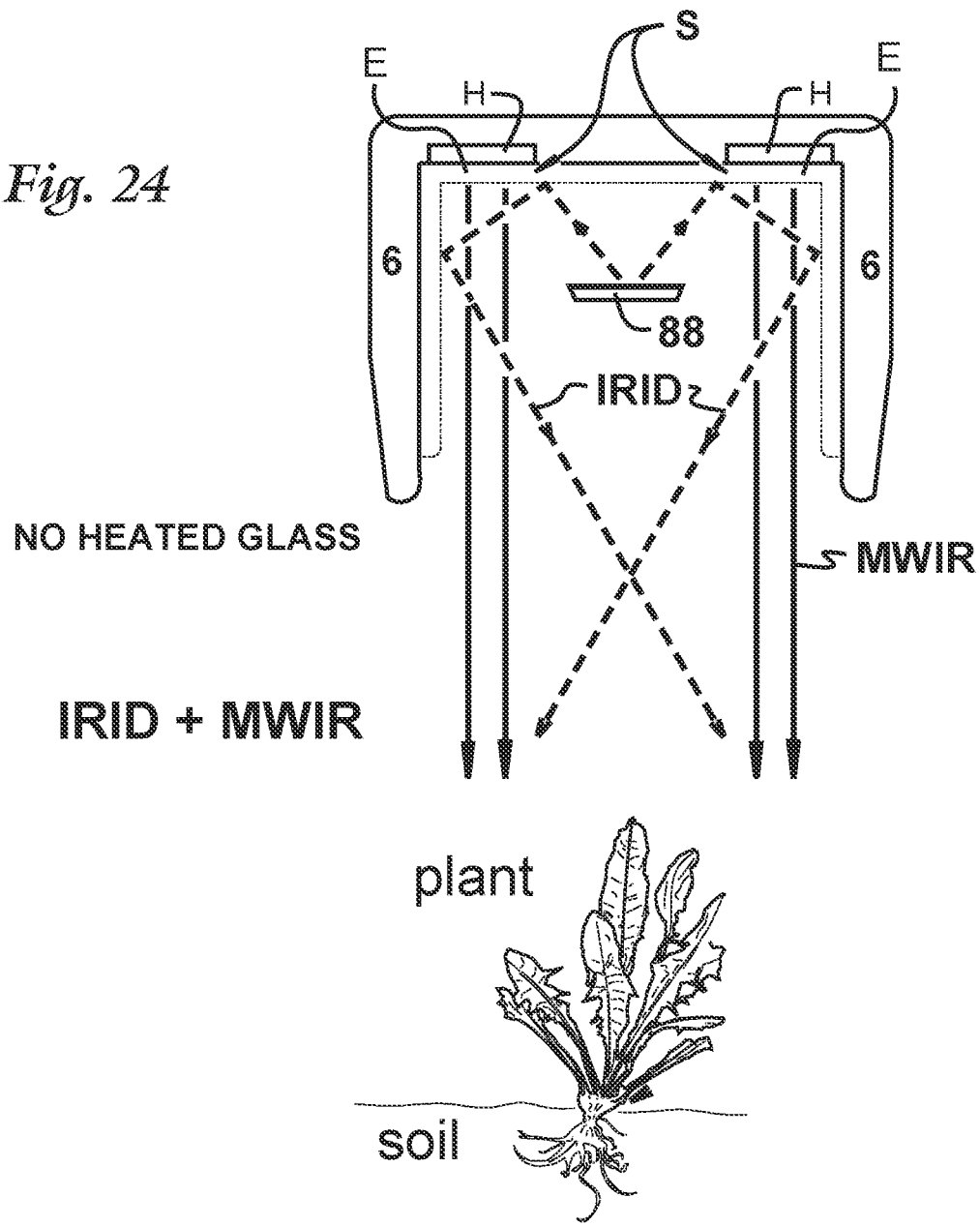
FIG. 24 shows a cross-sectional schematic view similar to that shown in FIG. 23, an alternate embodiment using a proximity reflect-through configuration illuminator according to the invention, with a shrouded Indigo Region Illumination Distribution (IRID) emitter and illustratively shown with a non-glass MWIR emitter E.

Now referring to FIG. 24, a cross-sectional schematic view similar to that shown in FIG. 23 is shown, as another alternate illustrative embodiment using a proximity reflect-through configuration illuminator according to the invention, with a shrouded Indigo Region Illumination Distribution (IRID) emitter and illustratively shown with a non-glass MWIR emitter E. This is a PROXIMITY REFLECT-THROUGH CONFIGURATION as shown, so named because in essence the "blue" splash component or Indigo Region Illumination Distribution IRID is reflected off a MWIR emitter E on surface S before emerging directly to be directed upon a plant, as opposed to prior Figures where the Indigo Region Illumination Distribution IRID first passes directly through the MWIR emitter E.

LED array IRID emitter 88 is shown putting light output upward in the Figure, but it can be also, if desired, turned face down so light output is directly downward in the Figure. Kapton heater H is in thermal communication with at least a portion of surface S which becomes an MWIR emitter E. No heated glass (e.g., borosilicate glass) is needed, although a transparent cover can still be affixed for physical protection from soil, dirt, etc. Kapton heater H can have portions spaced to allow a cooler environment in the vicinity of LED array IRID emitter 88.

Although the Figure indicates "NO HEATED GLASS" for this illustrative example of an alternate embodiment, the hot surface S can be replaced with borosilicate glass or other materials in service of the invention to produce Medium Wavelength Infrared (MWIR). This open design allows for air flow, as the "cup" formed by housing 6 can be open to air, not necessarily blocked off by borosilicate glass, other glass or other cover.

Figure 25:
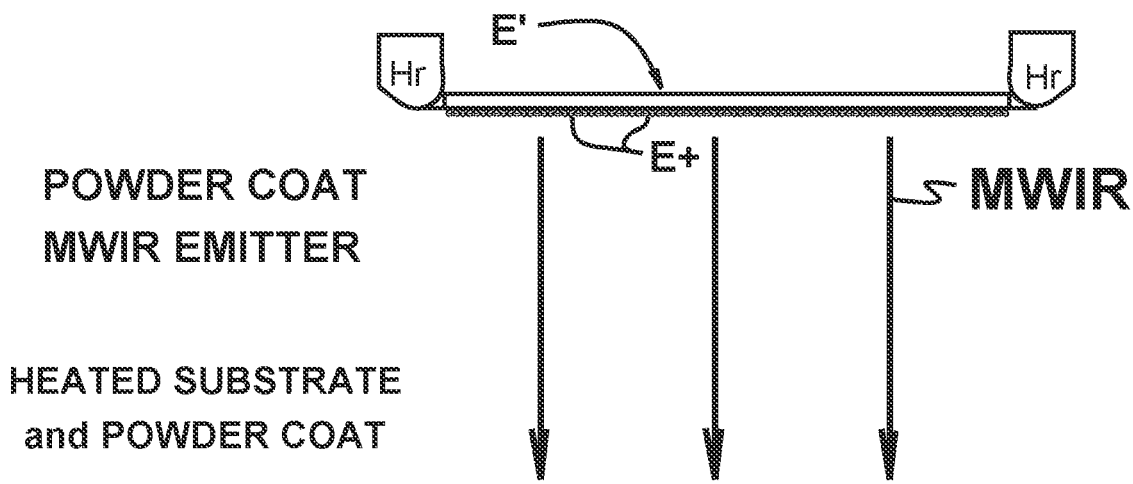
FIG. 25 shows a cross-sectional schematic view of a Medium Wavelength Infrared (MWIR) emitter that comprises an emissive powder coat for enhanced emission.

FIG. 25 shows a cross-sectional schematic view of a Medium Wavelength Infrared (MWIR) emitter that comprises an emissive powder coat for enhanced emission. A powder coat MWIR emitter, e.g., ground or powdered borosilicate glass, can be put onto a surface which is heated for operation according to the invention. Specifically, as shown, powder coat MWIR emitter E+ is affixed or coated upon a heated substrate E', which derives heat from heat ring Hr and associated Kapton heater H, not shown. Heat ring Hr can comprise any heat source (see Heat/Heated in the Definitions Section) such as a propane heater, as those skilled in the art can specify, along with needed reflectors or heat guides. Rays from any Indigo Region Illumination Distribution IRID passing though powder coat MWIR emitter E+ are not shown for clarity. This embodiment can reduce costs and weight, and can allow for optimization of output. One can use known powdered, sintered, or particulate materials, comprising borosilicate glass or other glasses or MWIR emissive materials, to provide a source for Medium Wavelength Infrared MWIR. If desired, underlying heated substrate E' can itself be a MWIR emitter E as well.

Figure 26:
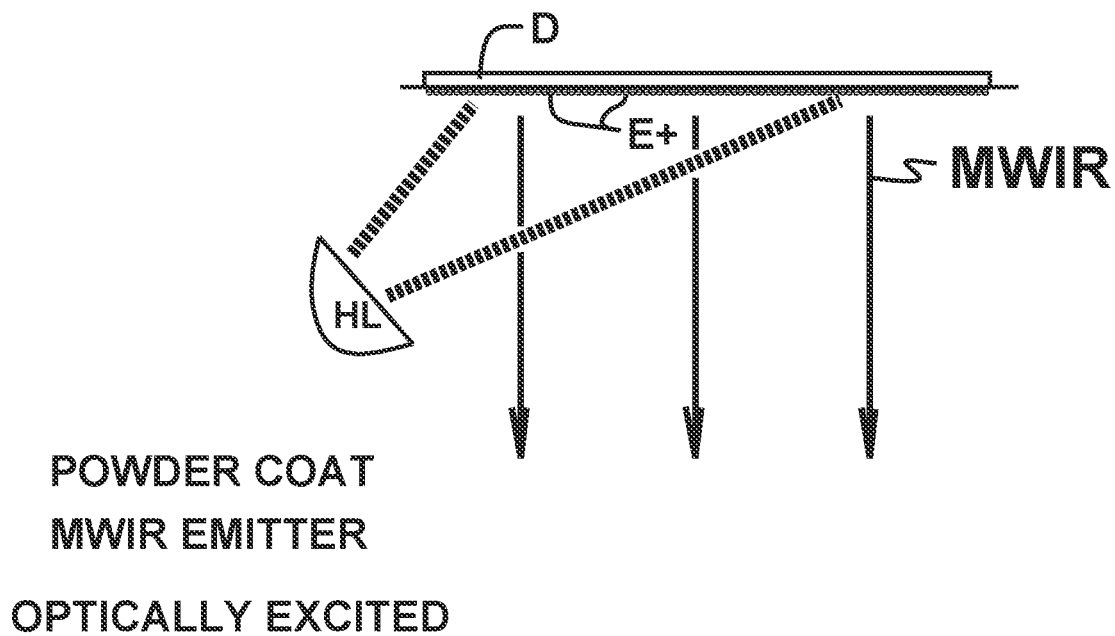
FIG. 26 shows a cross-sectional schematic view similar to that of FIG. 25, showing the emissive powder coat being externally optically energized with a lamp.

FIG. 26 shows a cross-sectional schematic view similar to that of FIG. 25, showing the emissive powder coat MWIR emitter E+ being externally optically energized or heated with a lamp or source HL. Any other heat source, such as a propane heater can be substituted therefor, as those of ordinary skill can specify. This allows the powder coat to be illuminated or heated independently to provide heating. This excitation can include optical radiation (in a variety of possible wavelengths) such as from lamps; glowing filaments or other bodies, microwave radiation, laser light, and flood and spot lamps, such as high intensity halogen enhance filament lamps, or LED lamps, using known reflector or other optics. Arrays can be used that are proximate the powder coat MWIR emitter E+ along a length, or a spot beam, such as that illustratively shown, can be used. In this illustrative example, a simple substrate D which is not an Medium Wavelength Infrared emitter, can be used.

As shown in FIG. 27, schematic arrangement is shown using separate MWIR and IRID sources used to irradiate a plant or seedling. Illustratively shown powder coat MWIR emitter E+ and LED array IRID emitter 88 are separately housed and light output is not undergoing superposition as in the previous Figures. Guide optics can be provided using known reflectors, transmitters, light guides, refractors, etc. to direct Medium Wavelength Infrared MWIR and Indigo Region Illumination Distribution IRID as taught and claimed. The guide optics can include moveable parts such as reflector flaps that respond yieldingly to being passed to over a plant, for ease of motion and application across a field.

Possible Medium Wavelength Infrared MWIR sources can include known $CO^2$ (carbon dioxide) lasers, and infrared LEDs (Light Emitting Diodes). $CO^2$ lasers can produce a beam of infrared light with the principal wavelength bands centering on 9.4 and 10.6 micrometers (μm).

Now referring to FIG. 28, a schematic series of apparatus and process components is shown for using the teachings of the instant invention with machine recognition and automated processes. Machine vision and recognition of undesirable plants is possible using known techniques and can be used with the instant invention to provide automated detection and eradication of nuisance vegetation.

Field leaf reflectance may vary with environmental parameters like soil type, light conditions, irregular terrain, and maintenance inputs (fertilizer, watering, etc.); as well as, plant variables such as irregular/dense sowing patterns, different plant species, growth stages, leaf moisture, and similar color of crop and weeds.

Machine vision to distinguish weeds in lawns, for example, can operate despite lawn condition variables such as soil characteristics and maintenance variables such as fertilizer and cut frequencies. Spectral reflectance variables can be detected using known methods to distinguish growth habits and differences in plant canopies, such as differences in an erectophile canopy versus a planophile canopy.

FIG. 28 shows known ultraviolet (UV) or visible (VIS) lights which illuminate a Field as shown. An image is received with a known Imager as shown, such as an imager system using a CCD (Charge Coupled Device) camera. The optical system can be controlled by a known electronic system that will flash UV/Visible lights (Image Capture Light) for a specific time in rapid succession. A known Light flash controller (shown) also triggers the CCD camera to capture an image shown (Image Capture) that uses Image pattern recognition, employing known techniques, to send signals to a Controller that selectively operates a Weed Disruptor that uses the teachings and methods given here.

Using known techniques, selected spectral regions for gathering information can processed. The wavelengths can be chosen based on weed reflection characteristics that distinguish them from grass or any desired crop. The images can be processed to register them with one another and determine the optical responses at each pixel. Automatic recognition of weeds will also include displaying edge effects for plant morphology determination and pinpointing root position. A known algorithm can include segmenting the scene for rapid identification and classification. Known electronics for post-processing images can be simple designs using graphics processing units (GPUs), field-programmable gated arrays and smart phones. Once a weed has been identified, the position of the target plant is passed to the controller that positions a device to act according to the instant teachings.

Such a machine recognition system can be a module positioned in front of the weed treatment mobile unit as depicted in the schematic shown in FIG. 29. Wheels on the mobile unit can record track positions and store information in a memory, whose construction, fabrication and interfacing is known in the art. During each flash of UV/visible light, the reflected light is collected by a CCD camera with high dynamic range. Images can be processed onboard the mobile unit and the controller can be used to place appropriate components as disclosed here over a target weed for processing.

The imager as shown in FIG. 29 can be mounted in front of a carriage that houses electronics. This carriage can be part of the mobile unit. The position of the carriage can be encoded by a known digital sensing system synchronized with the rotation of the wheels. This information is used in by a control algorithm constructed by those with ordinary skill in the art, with image ID results to automatically place desired operative components over the weed root position or turn on the appropriate near-IR and UV-A light heads of known design, if multiple IR/UV heads are to be used.

A weed region segmentation algorithm can be based on a known adaptive progressive thresholding (APT) approach which automatically estimates the threshold value to accurately differentiate the weed region from the desired crop or grass. This technique employs a recursive procedure to obtain a coarse region of interest (ROI), which is then subjected to an adaptive filter operation so that a smaller enhanced region can be identified. This enhanced region is subjected to the APT procedure again and then the process of performing the filtering operation is repeated as before. Repetition of this process in an iterative manner facilitates the rapid identification of the weed region accurately. The iterative procedure can be stopped by employing a pre-computed cumulative limiting factor (CLF), which depends on the complexity of the images due to the unpredictable reflection characteristics of the environment, leading to the extraction of accurate weed regions in the images. Known techniques can use this to advantage in segmentation and classification of broadleaf and grass weeds. Known feature extraction can be achieved using Gabor wavelets. Gabor wavelet features indicate the frequency content in localized frequency regions in the spatial domain. A Gabor wavelet transform can be obtained by convolving the signal with a filter bank in a known manner, whose impulse response in the time domain can be Gaussian-modulated by sine and cosine waves. Different choices of frequency and orientation provide a set of filters. A feed forward neural network with error back-propagation learning algorithm can be employed for weed classification based on the extracted Gabor wavelet features. These algorithms can be developed for rapid post processing of the imagery captured by the CCD cameras.

FIG. 30 shows a listing of possible adaptive stress vectors upon a plant including those which can arise while practicing the instant invention. Although no theory is given here and the following is not to be limiting, these are possible stress factors which may contribute to the unexpected degree of success using the invention. Plants subjected to the protocol as taught and claimed herein may be stressed by four simultaneous factors, including stresses delivered by the methods of the invention that constitute in some senses, a Forest Fire (above ground); High Intensity unprecedented MWIR signaling at root crown/below soil grade, High Intensity unprecedented IRID signaling at root crown/foliage, and a General high velocity shift in illumination exposure levels as a result of practicing the invention. This unnatural and simultaneous set of possible stresses may cause a plant to perish because it has not evolved to meet those stresses simultaneously.

While the illumination as taught herein and expressed in the appended claims can be used to eliminated, eradicate, or damage a plant, it can also be used for other purposes. There can arise situations where one wants to induce stress in a plant, to act as a signal for a sought after change in the plant, to enhance a kind of immunity or protection from common similar stresses, or to select strong plants for survival. To this end, one can, using the instant invention, use the protocols taught and claimed, and based on findings, further select a plant for one of retention, treatment, eradication or neglect. The instant invention can be practiced using partial exposure times or shortened flashes to accomplish these objectives.

Regarding exposures as taught and claimed herein, there are many possible factors which would require a practitioner of the method of the invention to change exposures, such as the varied effectiveness of the invention on many varied different plant species; plant environmental history, plant health, prior sun exposure, history of rain or water uptake, degree of past built-up plant protection, such as waxy layers on leaves and other physiological changes; rhizospheric and bulk soil MWIR transmissivity; miscellaneous species factors; plant condition; soil factors; special rhizospheric factors such as symbiotic effect of macrobiotica; plant life cycle/stage factors such as whether the plants to be eliminated are in early growth stage, maturity, giving off seeds, etcetera; the presence of ground debris which might block MWIR radiation from root crowns and nearby soil grade; and geographic location and climate, including average historical ambient UV levels. "Over-driven" states are possible where excess exposures are used for good measure to insure results.

The combination of the targeted IRID exposure to foliage and/or root crowns and the MWIR exposure to root crowns and/or the soil immediately adjacent root crowns provides unexpected results that are a departure from what was known previously.

Testing was successfully completed for trials of various durations, including 5, 10, 15, and 20 seconds. The method is effective, with actual lethality, with no regrowth later.

When a plant dies, it can be a complex process. Oxygen uptakes levels typically start to plummet, certain hormone levels go up, and the death process overall in the field of botany is not particularly well known. However, plants undergoing testing died as given by the protocol, with the statistical outliers that can be expected from any natural interaction. In a group of 100 plants, occasionally one plant would take as much as 2 weeks to die. During testing, immediate dieback was an observable, but death cannot and was not often ascertained immediately.

The dual component exposures according to the invention may be simultaneous, or partially simultaneous, and individually may be paused, stepwise or otherwise modulated. For example, a series of exposures or flashes can be used to achieve the method taught here. All total respective exposure times can total under 20 seconds, preferably; or more preferably, under 5 seconds, or more preferably, under one second.

Illustrative emphasis in this disclosure is on herbaceous, non-woody stalk plants, and the instant invention seeks to eradicate plants of a certain size, as well as seedlings. However, the methods and teachings here can be applied to eradication and control of certain tap-root or woody stalk plants. The methods taught and claimed here are not dependent on the existence of a particular species or organism.

Not shown herein are known solid or telescopic pipes or other elements which retain or position an illuminator using the instant invention which those of ordinary skill will be able to devise. The invention can be set in motion using known means to accomplish the same objectives over a wide area. Autonomous, non-autonomous, powered, or non-powered vehicles can be used to scan, survey or treat a field, using illumination as taught and claimed, or using communication to other, external light sources.

Imaging optics can be added to practice the protocol of the invention, including parabolic curved sections, or sections that resemble a compound parabolic curve; non-imaging optics can also be used. If desired, one can redirect all electromagnetic emissions as taught and claimed in the instant disclosure using mirrors, lenses, foil arrays, or light guides and pipes without departing from the scope of the invention. Similarly, those of ordinary skill can add light wavelengths to the exposure protocols without departing from the invention or the appended claims. Addition of white or red light was found to have no perceptible increase in effectiveness, but other objectives can be served if desired, namely, one can add power, i.e., over-expose without departing from the scope of the invention or claims.

Measurement units were chosen illustratively and in the appended claims include irradiance in W/cm² but radiance or other measures can be used and would by fair conversion read upon the appended claims if equivalent.

For clarity, the invention has been described in structural and functional terms. Those reading the appended claims will appreciate that those skilled in the art can formulate, based on the teachings herein, embodiments not specifically presented here.

Production, whether intentional or not, of irradiance levels that are under the magnitude of powers as given in the appended claims shall not be considered a departure from the claims if a power level as claimed is used at any time during treatment.

The illumination protocol disclosed and claimed here can be supplemented with visible light, which can enhance user safety by increasing avoidance and can allow for pupil contraction of the eye of an operator; other radiations can be added with without departing from the appended claims.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the optional features mentioned above. Also, nothing as taught and claimed here shall preclude addition of other structures, functional elements, or systems.

Obviously, many modifications and variations of the present invention are possible in light of the above teaching. It is therefore to be understood that, within the scope of the appended claims, the invention may be practiced otherwise than as specifically described or suggested here.

We claim:

1. A non-invasive, low-irradiance proximity illuminator (10) providing an Indigo Region Illumination Distribution (IRID) and Medium Wavelength Infrared (MWIR) radiation about a plant during a treatment time, said illuminator comprising:
    [a] a foliage and root crown illumination source comprising an IRID emitter (88), said IRID emitter so formed, constructed and operable to expose any of a foliage of said plant and a root crown of said plant to said Indigo Region Illumination Distribution (IRID) of an average irradiance $E_{IRID}$ to be any of between 0.125 W/cm² and 2 W/cm², between 0.05 W/cm² and 0.125 W/cm², between 0.125 W/cm² and 6.875 W/cm², and between 0.1 W/cm² and 1 W/cm²; and
    [b] a root crown and soil grade illumination source comprising an MWIR emitter (E) so formed, constructed and operable to expose any of a root crown of said plant and a soil grade immediately adjacent said root crown to infrared radiation that is substantially said Medium Wavelength Infrared (MWIR) radiation of an average irradiance $E_{MWIR}$ to be any of between 0.045 W/cm² and 0.72 W/cm², between 0.25 W/cm² and 6.95 W/cm², between 0 W/cm² and 7 W/cm², and between 0.035 W/cm² and 0.35 W/cm²;
    said IRID emitter and said MWIR emitter each so further sized, positioned and oriented to allow signaling said plant, but with said Indigo Region Illumination Distribution (IRID) and Medium Wavelength Infrared (MWIR) radiation not sufficient together to cause substantial high temperature thermally-induced leaf and plant component failure, and so constructed to allow that at least some light output from each of said IRID emitter and MWIR emitter to be substantially superposed for directing to said plant.

2. The illuminator of claim 1, wherein said IRID emitter and said MWIR emitter are further each so sized, positioned and oriented to offer a proximity pass-through configuration whereby at least some of said light output from said IRID emitter passes through said MWIR emitter.

3. The illuminator of claim 2, additionally comprising a thermal shield so sized, positioned and oriented to reduce thermal back-emission from said MWIR emitter to said IRID emitter, said thermal shield comprising at least one of an IR-reflector (Z) and an IR-insulator (Y).

4. The illuminator of claim 1, wherein said MWIR emitter additionally comprises a glass selected from borosilicate glass, and soda lime glass.

5. The illuminator of claim 4, additionally comprising a heater (H, Hr) in thermal communication with said glass.

6. The illuminator of claim 1, wherein said IRID emitter is further positioned to allow at least some of said light output therefrom to reflect off a surface (S) before emerging from said illuminator.

7. The illuminator of claim 6, wherein said surface comprises at least part of said MWIR emitter.

8. The illuminator of claim 1, wherein said MWIR emitter comprises a powder coat (E+).

9. The illuminator of claim 8, additionally comprising a radiant source (HL) to heat said powder coat.

10. The illuminator of claim 8, wherein said powder coat additionally comprises a glass selected from borosilicate glass, and soda lime glass.

\* \* \* \* \*